US011856413B2

(12) United States Patent
Huang et al.

(10) Patent No.: US 11,856,413 B2
(45) Date of Patent: Dec. 26, 2023

(54) COVERAGE ENHANCEMENT CE FUNCTION IMPLEMENTATION METHOD AND DEVICE

(71) Applicant: HUAWEI TECHNOLOGIES CO., LTD., Guangdong (CN)

(72) Inventors: Zhenglei Huang, Beijing (CN); Wanqiang Zhang, Beijing (CN); Qiang Deng, Shenzhen (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 197 days.

(21) Appl. No.: 16/229,531

(22) Filed: Dec. 21, 2018

(65) Prior Publication Data

US 2019/0116501 A1    Apr. 18, 2019

Related U.S. Application Data

(63) Continuation of application No. PCT/CN2016/088447, filed on Jul. 4, 2016.

(51) Int. Cl.
*H04W 72/04* (2023.01)
*H04W 16/26* (2009.01)
(Continued)

(52) U.S. Cl.
CPC .......... *H04W 16/26* (2013.01); *H04W 8/04* (2013.01); *H04W 8/08* (2013.01); *H04W 8/22* (2013.01); *H04W 12/06* (2013.01); *H04W 72/04* (2013.01)

(58) Field of Classification Search
None
See application file for complete search history.

(56) References Cited

U.S. PATENT DOCUMENTS 10,129,840 B2 * 11/2018 Zhu ................. H04W 48/08
10,182,457 B2 * 1/2019 Wang ............... H04W 74/0833
(Continued)

FOREIGN PATENT DOCUMENTS

CN      103959878 A    7/2014
CN      105519181 A    4/2016
(Continued)

OTHER PUBLICATIONS

3GPP TSG-RAN WG2 #91BIS, R2-154513, Huawei, HiSilicon:"NB-IOT—Coverage Class Decision and Adaption", Malmo, Sweden, Oct. 5-9, 2015. 3 pages.
(Continued)

*Primary Examiner* — Willie J Daniel, Jr.
(74) *Attorney, Agent, or Firm* — WOMBLE BOND DICKINSON (US) LLP

(57) ABSTRACT

Embodiments of the present application provide a coverage enhancement (CE) function implementation method and a device. The method may include obtaining, by a first radio access network node, CE authorization information of a terminal. The CE authorization information may include at least one of the following: CE indication information and an authorized CE level range. Further, the method may include determining, by the first radio access network node based on the CE authorization information, whether a CE level of the terminal meets an authorization requirement, and controlling, based on an authorization result, use of a CE function by the terminal. It can be learned that, not all terminals can use the CE function, but only an authorized terminal can use
(Continued)

the CE function, to ensure that the terminal can use the CE function properly within an authorized range and to improve radio channel resource use efficiency.

14 Claims, 10 Drawing Sheets

(51) Int. Cl.
  *H04W 8/04* (2009.01)
  *H04W 8/08* (2009.01)
  *H04W 8/22* (2009.01)
  *H04W 12/06* (2021.01)

(56) References Cited

U.S. PATENT DOCUMENTS

| | | |
|---|---|---|
| 2016/0037540 A1 | 2/2016 | Johansson et al. |
| 2016/0211960 A1 | 7/2016 | Wang et al. |
| 2019/0110241 A1* | 4/2019 | Jain .................. H04L 1/1864 |

FOREIGN PATENT DOCUMENTS

| | | |
|---|---|---|
| CN | 105557045 A | 5/2016 |
| EP | 2903363 A1 | 8/2015 |
| WO | 2014148859 A1 | 9/2014 |
| WO | 2015113817 A1 | 8/2015 |

OTHER PUBLICATIONS

"3GPP TR 23.720 V13.0.0 (Mar. 2016), 3rd Generation Partnership Project; Technical Specification Group Services and System Aspects;Study on architecture enhancements for Cellular Internet of Things(Release 13), Mar. 2016. 94 pages."

3GPP TS 36.300 V13.3.0 (Mar. 2016), 3rd Generation Partnership Project; Technical Specification Group Radio Access Network;Evolved Universal Terrestrial Radio Access (E-UTRA) and Evolved Universal Terrestrial Radio Access Network (E-UTRAN);Overall description;Stage 2(Release 13), Mar. 2016. 295 pages.

"3GPP TS 23.401 V14.0.0 (Jun. 2016), 3rd Generation Partnership Project; Technical Specification Group Services and System Aspects; General Packet Radio Service (GPRS) enhancements for Evolved Universal Terrestrial Radio Access Network (E-UTRAN) access(Release 14), Jun. 2016. 374 pages."

SA WG2 Meeting #111, S2-153602, Ericsson:"Requirement for authorization of usage of Coverage Enhancements", Chengdu, P. R. China, Oct. 19-23, 2015. 1 page.

INTEL:"New Study item on extended architecture support for Cellular Internet of Things", 3GPP DRAFT;S2-163133, vol. SA WG2, No. Nan jing, P.R. China; May 27, 2016, XP051116589, 6 pages.

* cited by examiner

COVERAGE ENHANCEMENT CE FUNCTION IMPLEMENTATION METHOD AND DEVICE

CROSS-REFERENCE TO RELATED APPLICATIONS

This application is a continuation of International Application No. PCT/CN2016/088447, filed on Jul. 4, 2016, the disclosure of which is hereby incorporated by reference in its entirety.

TECHNICAL FIELD

Embodiments of the present application relate to the field of Internet of Things technologies, and in particular, to a coverage enhancement (CE) function implementation method and a device.

BACKGROUND

With rapid development of Internet of Things technologies, a coverage enhancement (CE) technology is introduced in the 3rd Generation Partnership Project (3GPP) to support Internet of Things applications in different scenarios (for example, a weak-coverage scenario such as a basement scenario or a pipeline scenario). However, a terminal is not always located in a place with relatively poor coverage. Therefore, as shown in FIG. 1A (FIG. 1A is a schematic diagram of CE level classification), different coverage levels (referred to as coverage enhancement levels in 3GPP TR 23.720 and referred to as coverage classes in 3GPP TS 36.300) are classified. Different modulation and coding schemes and different retransmission/transmission schemes are used for the different CE levels (for example, a larger CE level indicates poorer coverage of the terminal, more retransmission times, and a higher reliability requirement on a corresponding modulation and coding scheme), to improve a system capacity (for example, a quantity of users who can simultaneously access a system or a maximum transmission rate), reduce battery power consumption of the terminal, and reduce a latency while ensuring coverage.

Usually, a CE level of a terminal may be static or dynamic. For a static CE level, the CE level keeps unchanged for a period of time once selected, and is mainly suitable for a terminal that is relatively fixed and that moves less, for example, a terminal such as a water meter or an electricity meter (signal coverage does not frequently change). For a dynamic CE level, signal coverage may frequently change (or in other words, the CE level may need to be correspondingly adjusted) with movement of a terminal.

In a conventional CE function implementation, for the dynamic CE level, a CE level used by a terminal in a cell is usually adjusted by the terminal based on a radio channel quality change of the terminal, and the terminal accesses a network by using a radio channel resource corresponding to the CE level (or in other words, the terminal uses a CE function based on only radio channel quality of the terminal). For example, a plurality of radio channel quality thresholds may be preset. If the radio channel quality of the terminal is less than or equal to a preset threshold 1, the terminal uses a CE level 3. If the radio channel quality of the terminal is greater than the preset threshold 1 but is less than or equal to a preset threshold 2 (the preset threshold 2 is greater than the preset threshold 1), the terminal uses a CE level 2. However, because a multiple-retransmission technology and the like are used in the coverage enhancement technology, retransmission consumes an additional radio channel resource every time. Especially for an Internet of Things application scenario with a relatively large quantity of terminals but relatively narrow bandwidth, a radio channel resource available for access is quite limited. Therefore, if the terminal uses the CE function based on only the radio channel quality of the terminal, proper use of the radio channel resource by the terminal cannot be ensured, and radio channel resource use efficiency is relatively low.

SUMMARY

Embodiments of the present application provide a coverage enhancement CE function implementation method and a device, to ensure that a terminal can use a CE function properly within an authorized range and to improve radio channel resource use efficiency.

According to a first aspect, an embodiment of the present application provides a coverage enhancement CE function implementation method, including:

obtaining, by a first radio access network node, CE authorization information of a terminal, where the CE authorization information includes at least one of the following: CE indication information and an authorized CE level range; and determining, by the first radio access network node based on the CE authorization information, whether a CE level of the terminal meets an authorization requirement, and controlling, based on an authorization result, use of a CE function by the terminal.

According to the CE function implementation method provided in the first aspect, the first radio access network node obtains the CE authorization information of the terminal, determines, based on the CE authorization information, whether the CE level of the terminal meets the authorization requirement, and controls, based on the authorization result, use of the CE function by the terminal. It can be learned that, not all terminals can use the CE function, but only an authorized terminal can use the CE function, to ensure that the terminal can use the CE function properly within an authorized range and to improve radio channel resource use efficiency.

In a possible embodiment, the CE indication information is used to indicate whether the terminal is allowed to use the CE function, and the authorized CE level range is used to indicate a range of a CE level that the terminal is allowed to use.

In a possible embodiment, if the CE authorization information includes the CE indication information, the determining, by the first radio access network node based on the CE authorization information, whether a CE level of the terminal meets an authorization requirement includes:

determining, by the first radio access network node based on the CE indication information, whether the terminal is allowed to use the CE function; and if the first radio access network node determines, based on the CE indication information, that the terminal is allowed to use the CE function, determining, by the first radio access network node, that the CE level of the terminal meets the authorization requirement; or if the first radio access network node determines, based on the CE indication information, that the terminal is not allowed to use the CE function, determining, by the first radio access network node, that the CE level of the terminal does not meet the authorization requirement.

In a possible embodiment, if the CE authorization information includes the authorized CE level range, the determining, by the first radio access network node based on the CE authorization information, whether a CE level of the terminal meets an authorization requirement includes:

determining, by the first radio access network node based on the CE authorization information, whether the CE level of the terminal falls within the authorized CE level range; and if the CE level of the terminal falls within the authorized CE level range, determining, by the first radio access network node, that the CE level of the terminal meets the authorization requirement; or if the CE level of the terminal falls beyond the authorized CE level range, determining, by the first radio access network node, that the CE level of the terminal does not meet the authorization requirement.

In a possible design, before the determining, by the first radio access network node based on the CE authorization information, whether the CE level of the terminal falls within the authorized CE level range, the method further includes:

determining, by the first radio access network node, the CE level of the terminal based on a radio access channel resource used by the terminal, where the radio access channel resource is a radio channel resource used by the terminal to initiate random access.

In a possible embodiment, the controlling, by the first radio access network node based on an authorization result, use of a CE function by the terminal includes:

if the authorization result is that the CE level of the terminal meets the authorization requirement, allowing, by the first radio access network node, the terminal to access a network by using a radio channel resource corresponding to the CE level; or if the authorization result is that the CE level of the terminal does not meet the authorization requirement, rejecting, by the first radio access network node, access of the terminal to a network.

According to the CE function implementation method provided in this embodiment, the first radio access network node determines, based on the CE authorization information, whether the CE level of the terminal meets the authorization requirement, and if the authorization result is that the CE level of the terminal meets the authorization requirement, the first radio access network node allows the terminal to access the network by using the radio channel resource corresponding to the CE level; or if the authorization result is that the CE level of the terminal does not meet the authorization requirement, the first radio access network node rejects access of the terminal to the network. It can be learned that, not all terminals can use the CE function, but only an authorized terminal can use the CE function, to ensure that the terminal can use the CE function properly within an authorized range and to improve radio channel resource use efficiency.

In a possible embodiment, the obtaining, by a first radio access network node, CE authorization information of a terminal includes:

locally obtaining, by the first radio access network node, the stored CE authorization information of the terminal; or receiving, by the first radio access network node, the CE authorization information of the terminal sent by a core network node; or receiving, by the first radio access network node, the CE authorization information of the terminal sent by a second radio access network node, where the second radio access network node is a historical radio access network node accessed by the terminal, and the historical radio access network node stores the CE authorization information of the terminal.

In a possible embodiment, the obtaining, by a first radio access network node, CE authorization information of a terminal includes:

receiving, by the first radio access network node, CE authorization assistance information sent by a core network node or a second radio access network node, where the second radio access network node is a historical radio access network node accessed by the terminal, and the historical radio access network node stores the CE authorization assistance information of the terminal; and determining, by the first radio access network node, the CE authorization information of the terminal based on the CE authorization assistance information.

In a possible design, the CE authorization assistance information includes at least one of the following: whether the terminal subscribes to the CE function and a range of a CE level to which the terminal subscribes.

In a possible embodiment, if the CE authorization assistance information includes whether the terminal subscribes to the CE function, the determining, by the first radio access network node, the CE authorization information of the terminal based on the CE authorization assistance information includes:

determining, by the first radio access network node, the CE indication information based on the CE authorization assistance information and/or a local policy, where the local policy includes at least one of the following: information about a radio channel resource supporting the CE function and a radio channel resource use status.

In a possible embodiment, if the CE authorization assistance information includes the range of a CE level to which the terminal subscribes, the determining, by the first radio access network node, the CE authorization information of the terminal based on the CE authorization assistance information includes:

determining, by the first radio access network node, the authorized CE level range based on the CE authorization assistance information and/or a local policy, where the local policy includes at least one of the following: information about a radio channel resource supporting the CE function and a radio channel resource use status.

According to a second aspect, an embodiment of the present application provides a coverage enhancement CE function implementation method, including:

determining, by a core network node, CE authorization information of a terminal based on subscription information and CE capability information of the terminal, where the CE authorization information includes at least one of the following: CE indication information and an authorized CE level range; and sending, by the core network node, the CE authorization information to the terminal and/or a first radio access network node, so that the terminal and/or the first radio access network node determine/determines, based on the CE authorization information, whether a CE level of the terminal meets an authorization requirement.

According to the CE function implementation method provided in the second aspect, the core network node determines the CE authorization information of the terminal based on the subscription information and the CE capability information of the terminal, and sends the CE authorization information to the terminal and/or the first radio access network node, so that the terminal and/or the first radio access network node determine/determines, based on the CE authorization information, whether the CE level of the terminal meets the authorization requirement. In this way, only an authorized terminal can use a CE function, to ensure that the terminal can use the CE function properly within an authorized range and to improve radio channel resource use efficiency.

According to a third aspect, an embodiment of the present application provides a coverage enhancement CE function implementation method, including:

determining, by a core network node, CE authorization assistance information based on subscription information of a terminal; and sending, by the core network node, the CE authorization assistance information to a first radio access network node, so that the first radio access network node determines CE authorization information of the terminal based on the CE authorization assistance information, where the CE authorization information includes at least one of the following: CE indication information and an authorized CE level range.

According to the CE function implementation method provided in the third aspect, the core network node determines the CE authorization assistance information based on the subscription information of the terminal, and sends the CE authorization assistance information to the first radio access network node, so that the first radio access network node determines the CE authorization information of the terminal based on the CE authorization assistance information, determines, based on the CE authorization information, whether a CE level of the terminal meets an authorization requirement, and controls, based on an authorization result, use of a CE function by the terminal. It can be learned that, not all terminals can use the CE function, but only an authorized terminal can use the CE function, to ensure that the terminal can use the CE function properly within an authorized range and to improve radio channel resource use efficiency.

In a possible embodiment, the CE authorization assistance information includes at least one of the following: whether the terminal subscribes to a CE function and a range of a CE level to which the terminal subscribes.

According to a fourth aspect, an embodiment of the present application provides a coverage enhancement CE function implementation method, including:

receiving, by a terminal, CE authorization information of the terminal sent by a core network node, where the CE authorization information includes at least one of the following: CE indication information and an authorized CE level range; and determining, by the terminal based on the CE authorization information, whether a CE level of the terminal meets an authorization requirement, and using a CE function based on an authorization result.

According to the CE function implementation method provided in the fourth aspect, the terminal receives the CE authorization information of the terminal sent by the core network node, determines, based on the CE authorization information, whether the CE level of the terminal meets the authorization requirement, and uses the CE function based on the authorization result. It can be learned that, not all terminals can use the CE function, but only an authorized terminal can use the CE function, to ensure that the terminal can use the CE function properly within an authorized range and to improve radio channel resource use efficiency.

In a possible embodiment, if the CE authorization information includes the CE indication information, the determining, by the terminal based on the CE authorization information, whether a CE level of the terminal meets an authorization requirement includes:

determining, by the terminal based on the CE indication information, whether the terminal is allowed to use the CE function; and if the terminal determines, based on the CE indication information, that the terminal is allowed to use the CE function, determining, by the terminal, that the CE level of the terminal meets the authorization requirement; or if the terminal determines, based on the CE indication information, that the terminal is not allowed to use the CE function, determining, by the terminal, that the CE level of the terminal does not meet the authorization requirement.

In a possible embodiment, if the CE authorization information includes the authorized CE level range, the determining, by the terminal based on the CE authorization information, whether a CE level of the terminal meets an authorization requirement includes:

determining, by the terminal based on the CE authorization information, whether the CE level of the terminal falls within the authorized CE level range; and if the CE level of the terminal falls within the authorized CE level range, determining, by the terminal, that the CE level of the terminal meets the authorization requirement; or if the CE level of the terminal falls beyond the authorized CE level range, determining, by the terminal, that the CE level of the terminal does not meet the authorization requirement.

In a possible embodiment, the using a CE function based on an authorization result includes:

if the authorization result is that the CE level of the terminal meets the authorization requirement, accessing, by the terminal, a network by using a radio channel resource corresponding to the CE level; or if the authorization result is that the CE level of the terminal does not meet the authorization requirement, skipping, by the terminal, initiating random access.

According to a fifth aspect, an embodiment of the present application provides a radio access network node. The radio access network node is a first radio access network node, and the first radio access network node includes:

an obtaining module, configured to obtain CE authorization information of a terminal, where the CE authorization information includes at least one of the following: CE indication information and an authorized CE level range; and an authorization module, configured to: determine, based on the CE authorization information, whether a CE level of the terminal meets an authorization requirement, and control, based on an authorization result, use of a CE function by the terminal.

In a possible embodiment, the CE indication information is used to indicate whether the terminal is allowed to use the CE function, and the authorized CE level range is used to indicate a range of a CE level that the terminal is allowed to use.

In a possible embodiment, if the CE authorization information includes the CE indication information, the authorization module is specifically configured to:

determine, based on the CE indication information, whether the terminal is allowed to use the CE function; and if determining, based on the CE indication information, that the terminal is allowed to use the CE function, determine that the CE level of the terminal meets the authorization requirement; or if determining, based on the CE indication information, that the terminal is not allowed to use the CE function, determine that the CE level of the terminal does not meet the authorization requirement.

In a possible embodiment, if the CE authorization information includes the authorized CE level range, the authorization module is specifically configured to:

determine, based on the CE authorization information, whether the CE level of the terminal falls within the authorized CE level range; and if the CE level of the terminal falls within the authorized CE level range, determine that the CE level of the terminal meets the authorization requirement; or if the CE level of the terminal falls beyond the authorized CE level range, determine that the CE level of the terminal does not meet the authorization requirement.

In a possible embodiment, the authorization module is further configured to:

determine the CE level of the terminal based on a radio access channel resource used by the terminal, where the radio access channel resource is a radio channel resource used by the terminal to initiate random access.

In a possible embodiment, the authorization module is specifically configured to:

if the authorization result is that the CE level of the terminal meets the authorization requirement, allow the terminal to access a network by using a radio channel resource corresponding to the CE level; or if the authorization result is that the CE level of the terminal does not meet the authorization requirement, reject access of the terminal to a network.

In a possible embodiment, the obtaining module is specifically configured to:

locally obtain the stored CE authorization information of the terminal; or receive the CE authorization information of the terminal sent by a core network node; or receive the CE authorization information of the terminal sent by a second radio access network node, where the second radio access network node is a historical radio access network node accessed by the terminal, and the historical radio access network node stores the CE authorization information of the terminal.

In a possible embodiment, the obtaining module includes:

a receiving unit, configured to receive CE authorization assistance information sent by a core network node or a second radio access network node, where the second radio access network node is a historical radio access network node accessed by the terminal, and the historical radio access network node stores the CE authorization assistance information of the terminal; and a determining unit, configured to determine the CE authorization information of the terminal based on the CE authorization assistance information.

In a possible embodiment, the CE authorization assistance information includes at least one of the following: whether the terminal subscribes to the CE function and a range of a CE level to which the terminal subscribes.

In a possible embodiment, if the CE authorization assistance information includes whether the terminal subscribes to the CE function, the determining unit is specifically configured to:

determine the CE indication information based on the CE authorization assistance information and/or a local policy, where the local policy includes at least one of the following: information about a radio channel resource supporting the CE function and a radio channel resource use status.

In a possible embodiment, if the CE authorization assistance information includes the range of a CE level to which the terminal subscribes, the determining unit is specifically configured to:

determine the authorized CE level range based on the CE authorization assistance information and/or a local policy, where the local policy includes at least one of the following: information about a radio channel resource supporting the CE function and a radio channel resource use status.

For beneficial effects of the first radio access network node provided in the fifth aspect and possible implementations of the fifth aspect, refer to beneficial effects brought by possible implementations of the first aspect. Details are not described herein again.

According to a sixth aspect, an embodiment of the present application provides a core network node, including:

a determining module, configured to determine CE authorization information of a terminal based on subscription information and CE capability information of the terminal, where the CE authorization information includes at least one of the following: CE indication information and an authorized CE level range; and a sending module, configured to send the CE authorization information to the terminal and/or a first radio access network node, so that the terminal and/or the first radio access network node determine/determines, based on the CE authorization information, whether a CE level of the terminal meets an authorization requirement.

For beneficial effects of the core network node provided in an implementation of the sixth aspect, refer to beneficial effects brought by possible implementations of the second aspect. Details are not described herein again.

According to a seventh aspect, an embodiment of the present application provides a core network node, including:

a determining module, configured to determine CE authorization assistance information based on subscription information of a terminal; and a sending module, configured to send the CE authorization assistance information to a first radio access network node, so that the first radio access network node determines CE authorization information of the terminal based on the CE authorization assistance information, where the CE authorization information includes at least one of the following: CE indication information and an authorized CE level range.

In a possible embodiment, the CE authorization assistance information includes at least one of the following: whether the terminal subscribes to a CE function and a range of a CE level to which the terminal subscribes.

For beneficial effects of the core network node provided in the seventh aspect and possible implementations of the seventh aspect, refer to beneficial effects brought by possible implementations of the third aspect. Details are not described herein again.

According to an eighth aspect, an embodiment of the present application provides a terminal, including:

a receiving module, configured to receive CE authorization information of the terminal sent by a core network node, where the CE authorization information includes at least one of the following: CE indication information and an authorized CE level range; and an authorization module, configured to: determine, based on the CE authorization information, whether a CE level of the terminal meets an authorization requirement, and use a CE function based on an authorization result.

In a possible embodiment, if the CE authorization information includes the CE indication information, the authorization module is specifically configured to:

determine, based on the CE indication information, whether the terminal is allowed to use the CE function; and if determining, based on the CE indication information, that the terminal is allowed to use the CE function, determine that the CE level of the terminal meets the authorization requirement; or if determining, based on the CE indication information, that the terminal is not allowed to use the CE function, determine that the CE level of the terminal does not meet the authorization requirement.

In a possible embodiment, if the CE authorization information includes the authorized CE level range, the authorization module is specifically configured to:

determine, based on the CE authorization information, whether the CE level of the terminal falls within the authorized CE level range; and if the CE level of the terminal falls within the authorized CE level range, determine that the CE level of the terminal meets the authorization requirement; or if the CE level of the terminal falls beyond the authorized CE level range, determine that the CE level of the terminal does not meet the authorization requirement.

In a possible embodiment, the authorization module is specifically configured to:

if the authorization result is that the CE level of the terminal meets the authorization requirement, access a network by using a radio channel resource corresponding to the CE level; or if the authorization result is that the CE level of the terminal does not meet the authorization requirement, skip initiating random access.

For beneficial effects of the terminal provided in the eighth aspect and possible implementations of the eighth aspect, refer to beneficial effects brought by possible implementations of the fourth aspect. Details are not described herein again.

DESCRIPTION OF EMBODIMENTS

Figure 1A:
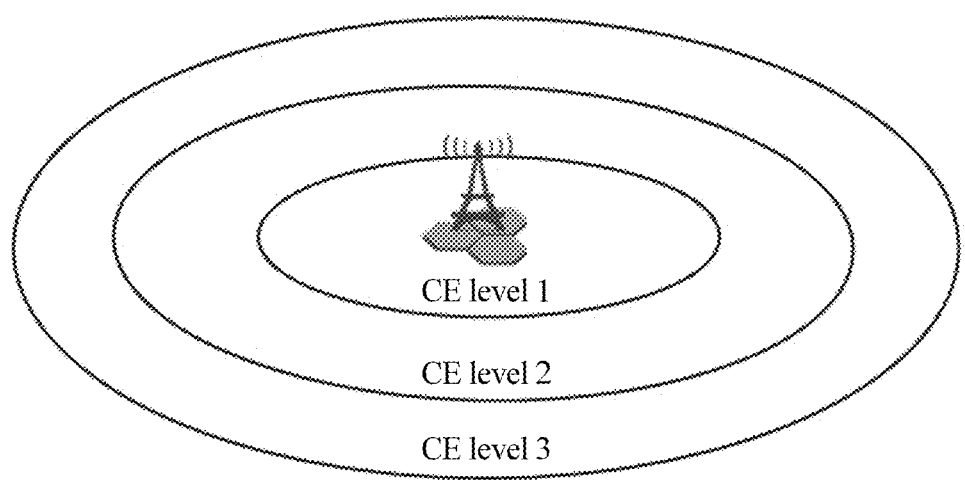
FIG. 1A is a schematic diagram of CE level classification.

To make the objectives, technical solutions, and advantages of the embodiments of the present application clearer, the following clearly describes the technical solutions in the embodiments of the present application with reference to the accompanying drawings in the embodiments of the present application. Obviously, the described embodiments are some rather than all of the embodiments of the present application. All other embodiments obtained by persons of ordinary skill in the art based on the embodiments of the present application without creative efforts shall fall within the protection scope of the present application.

A terminal, namely, user equipment (UE), in this application may be a wireless terminal or may be a wired terminal. The wireless terminal may be a device that provides voice and/or data connectivity for a user, a handheld device with a wireless connection function, or another processing device connected to a wireless modem. The wireless terminal may communicate with one or more core networks by using a radio access network (RAN). The wireless terminal may be a mobile terminal, such as a mobile phone (or referred to as a "cellular" phone) or a computer with a mobile terminal, for example, may be a portable, pocket-sized, handheld, computer built-in, or in-vehicle mobile apparatus, which exchanges voice and/or data with the radio access network. For example, the wireless terminal may be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile console (Mobile), a remote station, an access point, a remote terminal, an access terminal, a user terminal, a user agent, a user device, or user equipment.

Each of a first radio access network node and a second radio access network node in this application may be a device independently disposed on a radio access network (RAN) side, for example, a base station or a radio network controller (RNC), or may be a function module in the device on the radio access network side. Optionally, the first radio access network node is a radio access network node currently accessed by the terminal, and the second radio access network node is a historical radio access network node accessed by the terminal (that is, a radio access network node accessed before the terminal accesses the first radio access network node).

The base station (for example, an access point) may be a device in communication with a wireless terminal by using one or more sectors over an air interface in an access network. The base station may be configured to mutually convert a received over-the-air frame and an IP packet and serve as a router between the wireless terminal and a rest portion of the access network. The rest portion of the access network may include an Internet Protocol (IP) network. The base station may further coordinate attribute management of the air interface. For example, the base station may be a base transceiver station (BTS) in GSM or CDMA, may be a NodeB in WCDMA, or may be an evolved NodeB (NodeB, eNB, or e-NodeB, evolved NodeB) in LTE. This is not limited in this application.

A core network node in this application may be an MME.

Figure 1B:
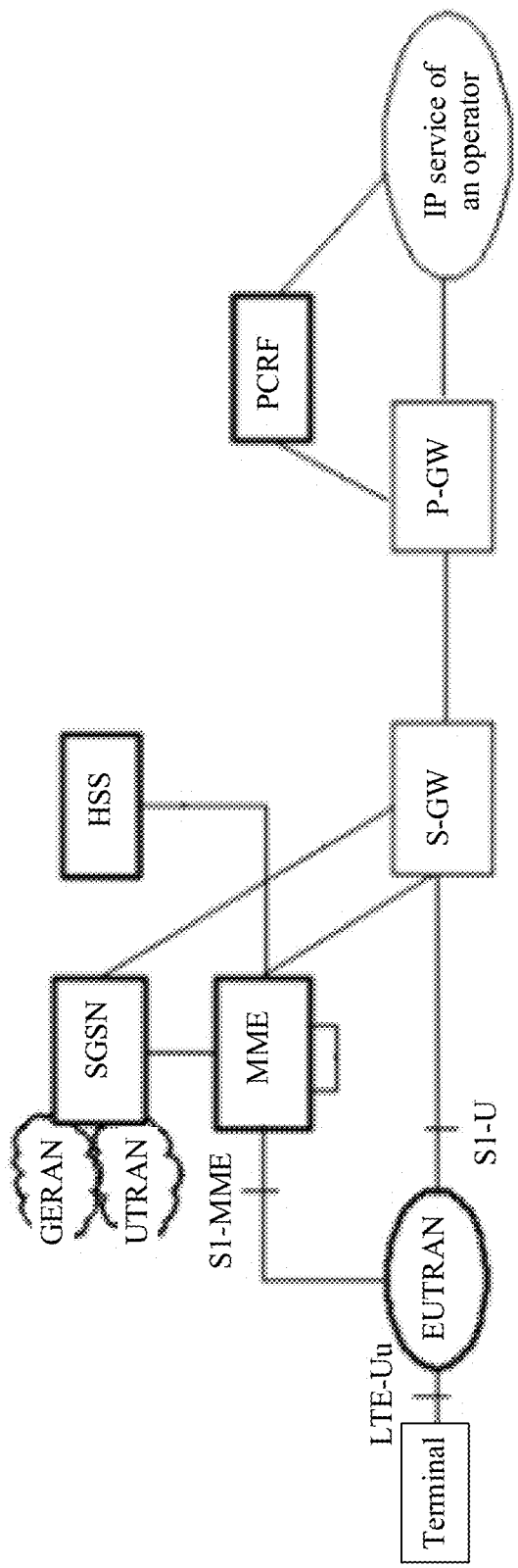
FIG. 1B is a schematic diagram of an EPS network architecture.

The embodiments of this application are mainly applicable to an application scenario in which a CE technology is used. The embodiments of this application are mainly applied to an evolved packet system (EPS). An EPS network architecture uses end-to-end all-Internet Protocol (IP) networking and a flattened network structure, and is fully compatible with an existing 2G/3G network. FIG. 1B is a schematic diagram of an EPS network architecture. As shown in FIG. 1B, main network entities include an evolved universal terrestrial radio access network (EUTRAN), a mobility management entity (MME), a serving gateway (S-), a packet data network gateway (P-GW), and the like. (1) The EUTRAN is a network including a plurality of base stations, configured to implement a wireless physical layer function and resource scheduling, radio resource management, radio access control, and mobility management functions. The base station is connected to the S-GW by using a user plane interface S1-U, to transmit user data. The base station is connected to the MME by using a control plane interface S1-MME, and implements a function such as radio access bearer control by using the S1-AP protocol. The base station is connected to a terminal by using an LTE-Uu interface. (2) The MME is mainly responsible for all control plane functions of user session management, including NAS signaling and security, tracking area management, selection of the P-GW and the S-GW, and the like. (3) The S-GW is mainly responsible for data transmission, forwarding, route switching, and the like for the terminal, and serve as a local mobility anchor during handover of the terminal between base stations (for each terminal, only one S-GW serves the terminal at each moment). (4) As an anchor of a PDN connection, the P-GW is responsible for IP address allocation to the terminal, data packet filtering for the terminal, rate control, charging information generation, and the like. (5) A home subscriber server (HSS) is a database for storing user subscription information. (6) A serving GPRS support node (SGSN) is mainly responsible for data transmission, forwarding, route switching, and the like for a 2G/3G terminal. (7) A policy and charging rules function (PCRF) unit is mainly responsible for quality of service (QoS) policy control and charging policy control for a service.

Considering that CE needs to consume an additional radio channel resource every time, to ensure proper use of a radio channel resource by a terminal, in the embodiments of this application, a network side controls, based on CE authorization information, use of a CE function by the terminal (or in other words, not all terminals can use the CE function, for example, only a terminal that subscribes to the CE function can use the CE function, or a terminal of a group user with a higher CE priority can use the CE function), or the terminal uses a CE function based on the CE authorization information, to ensure that the terminal can use the CE function properly within an authorized range and to improve radio channel resource use efficiency.

A coverage enhancement CE function implementation method and a device provided in the embodiments of the present application are described below in detail with reference to the accompanying drawings by using specific embodiments.

Figure 2:
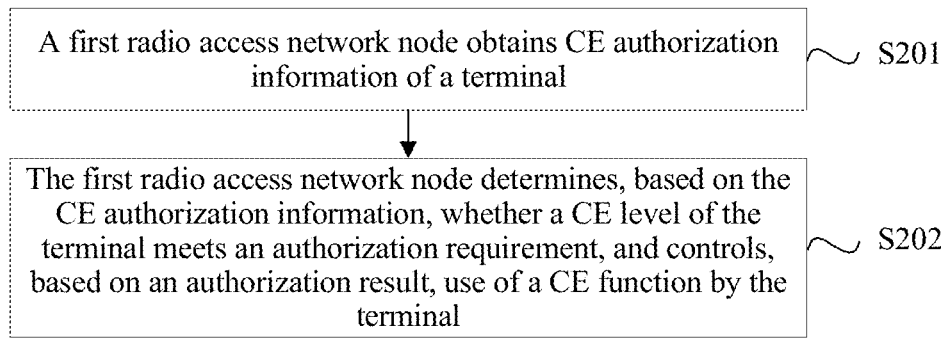
FIG. 2 is a schematic flowchart of Embodiment 1 of a coverage enhancement CE function implementation method according to the present application.

FIG. 2 is a schematic flowchart of Embodiment 1 of a coverage enhancement CE function implementation method according to the present application. As shown in FIG. 2, the method in this embodiment may include the following steps.

S201. A first radio access network node obtains CE authorization information of a terminal.

In this step, after the terminal determines a CE level of the terminal based on radio channel quality of the terminal and initiates a random access request based on a radio resource corresponding to the CE level, the first radio access network node (optionally, the first radio access network node is a base station currently accessed by the terminal) obtains the CE authorization information of the terminal. Optionally, the CE authorization information includes at least one of the following: CE indication information and an authorized CE level range. Certainly, the CE authorization information may further include other information (for example, a CE status, where the CE status is used to indicate dynamic CE or static CE). This is not limited in this embodiment of this application. The CE indication information is used to indicate whether the terminal is allowed to use a CE function, and the authorized CE level range is used to indicate a range of a CE level that the terminal is allowed to use. Optionally, the authorized CE level range may be a specific CE level limit (for example, a CE level that the terminal is allowed to use does not exceed a CE level 3). Alternatively, the authorized CE level range may be a CE mode (for example, it is assumed that a CE mode A indicates that the terminal can use a CE level 0 and a CE level 1, and a CE mode B indicates that the terminal can use a CE level 2 and a CE level 3, and if the authorized CE level range is the CE mode A, it indicates that a CE level that the terminal is allowed to use does not exceed the CE level 1). Optionally, the authorized CE level range may be expressed in another form. This is not limited in this embodiment of this application.

Optionally, the first radio access network node may obtain the CE authorization information of the terminal in the following several implementations:

First implementation: The first radio access network node locally obtains the stored CE authorization information of the terminal. Optionally, if the first radio access network node stores the CE authorization information of the terminal, the first radio access network node directly locally obtains the CE authorization information of the terminal. Optionally, that the first radio access network node stores the CE authorization information of the terminal may be as follows: Before the first radio access network node is accessed by the terminal, the first radio access network node obtains the CE authorization information of the terminal from a core network node (for example, an MME to which the terminal is currently attached or previously attached) and locally stores the CE authorization information of the terminal. Alternatively, before the first radio access network node is accessed by the terminal, the first radio access network node obtains the CE authorization information of the terminal from a historical radio access network node (for example, a second radio access network node) of the terminal and locally stores the CE authorization information of the terminal (optionally, the CE authorization information of the terminal may be returned by the second radio access network node after the second radio access network node receives a message that is sent by the first radio access network node and that is used to request to obtain the CE authorization information, or may be actively sent by the second radio access network node to the first radio access network node in a radio access network node switching process). Certainly, the CE authorization information of the terminal stored in the first radio access network node may be obtained in another manner. This is not limited in this embodiment of this application.

Second implementation: The first radio access network node receives the CE authorization information of the terminal sent by a second radio access network node. The second radio access network node is a historical radio access network node accessed by the terminal, and the historical radio access network node stores the CE authorization information of the terminal. Optionally, if the second radio access network node stores the CE authorization information of the terminal, after receiving a random access request sent by the terminal, the first radio access network node may request to obtain the CE authorization information of the terminal from the second radio access network node, and receive the CE authorization information of the terminal returned by the second radio access network node.

Third implementation: The first radio access network node receives the CE authorization information of the terminal sent by a core network node (for example, an MME to which the terminal is currently attached or previously attached). Optionally, after receiving a random access request sent by the terminal, the first radio access network node may request to obtain the CE authorization information of the terminal from the core network node, and receive the CE authorization information of the terminal returned by the core network node. Correspondingly, after the core network node receives a message that is sent by the first radio access network node and that is used to request to obtain the CE authorization information, the core network node determines the CE authorization information of the terminal based on subscription information (for example, including whether the terminal subscribes to the CE function and/or a range of a CE level to which the terminal subscribes) and CE capability information (for example, whether the terminal supports the CE function) of the terminal, and sends the CE authorization information of the terminal to the first radio access network node, so that the first radio access network node determines, based on the CE authorization information, whether a CE level of the terminal meets an authorization requirement. Optionally, the subscription information and/or the CE capability information may further include other information. This is not limited in this embodiment of this application.

Fourth implementation: (A) The first radio access network node receives CE authorization assistance information sent by a core network node (for example, an MME to which the terminal is currently attached or previously attached) or a second radio access network node. The second radio access network node is a historical radio access network node accessed by the terminal, and the historical radio access network node stores the CE authorization assistance information of the terminal. Optionally, the CE authorization assistance information includes at least one of the following: whether the terminal subscribes to the CE function and a range of a CE level to which the terminal subscribes (certainly, the CE authorization assistance information further includes other information, and this is not limited in this embodiment of this application). (B) The first radio access network node determines the CE authorization information of the terminal based on the CE authorization assistance information.

Optionally, in the fourth implementation, the first radio access network node requests the CE authorization assistance information of the terminal from the core network node or the second radio access network node, and receives the CE authorization assistance information of the terminal returned by the core network node or the second radio access network node. Further, the first radio access network node determines the CE authorization information of the terminal based on the CE authorization assistance information. Correspondingly, if the second radio access network node receives a request message that is of the first radio access network node and that is used to request the CE authorization assistance information, the second radio access network node sends the stored CE authorization assistance information of the terminal to the first radio access network node; or if the core network node receives a request message that is of the first radio access network node and that is used to request the CE authorization assistance information, the core network node determines the CE authorization assistance information based on subscription information of the terminal, and returns the CE authorization assistance information to the first radio access network node, so that the first radio access network node determines the CE authorization information of the terminal based on the CE authorization assistance information. Alternatively, in a base station switching process, the first radio access network node receives the CE authorization assistance information of the terminal actively sent by a historical radio access network node (for example, the second radio access network node) of the terminal. Certainly, the first radio access network node may obtain the CE authorization assistance information in another manner. This is not limited in this embodiment of this application.

Optionally, in the fourth implementation, if the CE authorization assistance information includes whether the terminal subscribes to the CE function, the first radio access network node determines the CE indication information of the terminal based on the CE authorization assistance information and/or a local policy. The local policy includes at least one of the following: information about a radio channel resource supporting the CE function (indicating a radio channel resource supporting the CE function) and a radio channel resource use status (indicating a remaining available radio channel resource supporting the CE function). Certainly, the local policy may further include other information. This is not limited in this embodiment of this application. For example, if the CE authorization assistance information indicates that the terminal subscribes to the CE function, but the remaining available radio channel resource supporting the CE function is insufficient, the first radio access network node still rejects use of the CE function by the terminal (or in other words, the CE indication information of the terminal is used to indicate that the terminal is not allowed to use the CE function).

Optionally, in the fourth implementation, if the CE authorization assistance information includes the range of a CE level to which the terminal subscribes, the first radio access network node determines the authorized CE level range based on the CE authorization assistance information and/or a local policy. The local policy includes at least one of the following: information about a radio channel resource supporting the CE function and a radio channel resource use status. Certainly, the local policy may further include other information. This is not limited in this embodiment of this application. For example, if the CE authorization assistance information indicates that the range of a CE level to which the terminal subscribes does not exceed a CE level 3, but a remaining available radio channel resource supporting the CE function is insufficient to support the CE level 3, the first radio access network node still rejects use of the CE level 3 by the terminal (or in other words, the authorized CE level range is used to indicate that a CE level that the terminal is allowed to use is lower than the CE level 3).

Optionally, in the fourth implementation, if the CE authorization assistance information includes whether the terminal subscribes to the CE function and the range of a CE level to which the terminal subscribes, the first radio access network node determines the CE authorization information (including the CE indication information and the authorized CE level range) based on the CE authorization assistance information and/or a local policy. Certainly, the local policy may further include other information. This is not limited in this embodiment of this application.

Certainly, the first radio access network node may obtain the CE authorization information of the terminal in another manner. This is not limited in this embodiment of this application.

S202. The first radio access network node determines, based on the CE authorization information, whether a CE level of the terminal meets an authorization requirement, and controls, based on an authorization result, use of a CE function by the terminal.

In this step, the first radio access network node determines, based on the CE authorization information, whether the CE level of the terminal meets the authorization requirement, and controls, based on the authorization result (for example, the CE level of the terminal meets the authorization requirement or the CE level of the terminal does not meet the authorization requirement), use of the CE function by the terminal. Optionally, (A) if the authorization result is that the CE level of the terminal meets the authorization requirement, the first radio access network node allows the terminal to access a network by using a radio channel resource corresponding to the CE level. Optionally, the first radio access network node may determine a CE transmission parameter (for example, retransmission times and/or a modulation and coding scheme) corresponding to the CE level, and send the CE transmission parameter to the terminal, so that the terminal performs data transmission based on the CE transmission parameter. (B) If the authorization result is that the CE level of the terminal does not meet the authorization requirement, the first radio access network node rejects access of the terminal to a network. Optionally, the first radio access network node may return a network access rejection message (which may carry information indicating that the CE function of the terminal does not meet the authorization requirement) to the terminal.

Optionally, if the CE authorization information includes the CE indication information, the first radio access network node determines, based on the CE indication information, whether the terminal is allowed to use the CE function. (A) If the first radio access network node determines, based on the CE indication information (for example, indicating that the terminal is allowed to use the CE function), that the terminal is allowed to use the CE function, the first radio access network node determines that the CE level of the terminal meets the authorization requirement. Optionally, the CE level of the terminal is a CE level of the terminal determined by the first radio access network node based on a radio access channel resource used by the terminal (that is, a radio channel resource used by the terminal to initiate random access). Optionally, because different radio channel resources correspond to different CE levels, the first radio access network node may determine, based on the radio access channel resource used by the terminal and a preset correspondence between a radio channel resource and a CE level, the CE level corresponding to the radio access channel resource used by the terminal. Certainly, the first radio access network node may determine, in another manner, the CE level corresponding to the radio access channel resource used by the terminal. This is not limited in this embodiment of this application. (B) If the first radio access network node determines, based on the CE indication information (indicating that the terminal is not allowed to use the CE function), that the terminal is not allowed to use the CE function, the first radio access network node determines that the CE level of the terminal does not meet the authorization requirement.

Optionally, if the CE authorization information includes the authorized CE level range (implicitly indicating that the terminal is allowed to use the CE function), the first radio access network node determines, based on the CE authorization information, whether the CE level of the terminal falls within the authorized CE level range. Optionally, the CE level of the terminal is a CE level of the terminal determined by the first radio access network node based on a radio access channel resource used by the terminal (that is, a radio channel resource used by the terminal to initiate random access). (A) If the CE level of the terminal falls within the authorized CE level range, the first radio access network node determines that the CE level of the terminal meets the authorization requirement. (B) If the CE level of the terminal falls beyond the authorized CE level range, the first radio access network node determines that the CE level of the terminal does not meet the authorization requirement. Optionally, before determining, based on the CE authorization information, whether the CE level of the terminal falls within the authorized CE level range, the first radio access network node may determine the CE level of the terminal based on the radio access channel resource used by the terminal (for a specific determining manner, refer to the foregoing part in this application, and details are not described herein again).

Optionally, if the CE authorization information includes the CE indication information and the authorized CE level range, the first radio access network node determines, based on the CE indication information, whether the terminal is allowed to use the CE function. (A1) If the first radio access network node determines, based on the CE indication information (indicating that the terminal is not allowed to use the CE function), that the terminal is not allowed to use the CE function, the first radio access network node determines that the CE level of the terminal does not meet the authorization requirement. (B1) If the first radio access network node determines, based on the CE indication information (for example, indicating that the terminal is allowed to use the CE function), that the terminal is allowed to use the CE function, the first radio access network node determines, based on the CE authorization information, whether the CE level of the terminal falls within the authorized CE level range. Optionally, the CE level of the terminal is a CE level of the terminal determined by the first radio access network node based on a radio access channel resource used by the terminal. (B11) If the CE level of the terminal falls within the authorized CE level range, the first radio access network node determines that the CE level of the terminal meets the authorization requirement. (B12) If the CE level of the terminal falls beyond the authorized CE level range, the first radio access network node determines that the CE level of the terminal does not meet the authorization requirement.

In view of the above, in this embodiment of this application, the first radio access network node obtains the CE authorization information of the terminal, determines, based on the CE authorization information, whether the CE level of the terminal meets the authorization requirement, and controls, based on the authorization result, use of the CE function by the terminal. It can be learned that, not all terminals can use the CE function, but only an authorized terminal can use the CE function, to ensure that the terminal can use the CE function properly within an authorized range and to improve radio channel resource use efficiency.

Figure 3:
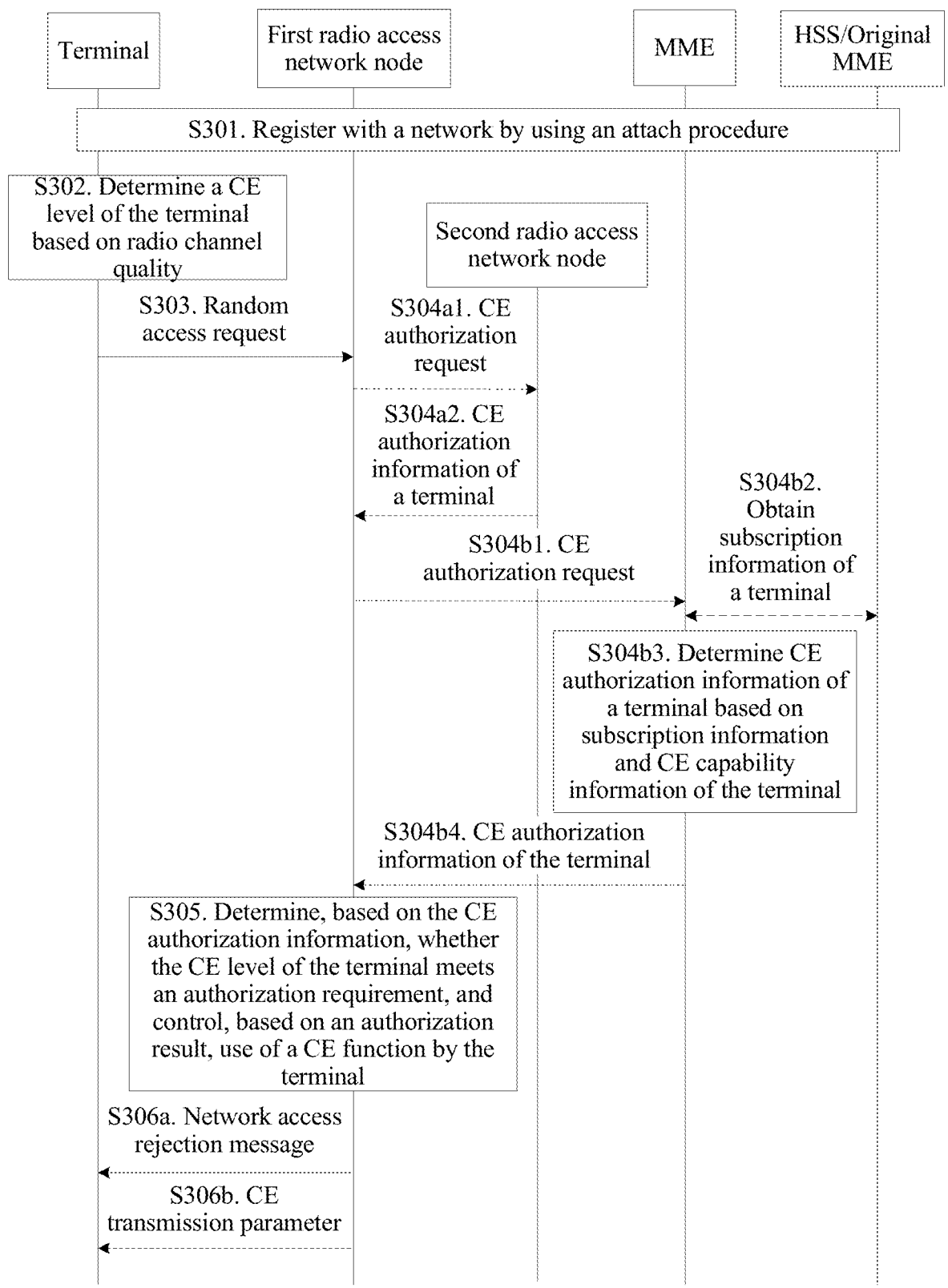
FIG. 3 is a schematic flowchart of Embodiment 2 of a coverage enhancement CE function implementation method according to the present application.

FIG. 3 is a schematic flowchart of Embodiment 2 of a coverage enhancement CE function implementation method according to the present application. Based on Embodiment 1, as shown in FIG. 3, the method in this embodiment may include the following steps.

S301. A terminal registers with a network by using an attach procedure.

Optionally, an MME (for example, an MME to which the terminal is currently attached) may obtain CE capability information (for example, whether the terminal supports a CE function) of the terminal in the attach procedure.

S302. The terminal determines a CE level of the terminal based on radio channel quality.

In this step, when the terminal has data or signaling to be sent, the terminal determines the CE level based on the radio channel quality.

S303. The terminal initiates a random access request.

Optionally, the terminal initiates the random access request by using a radio channel resource corresponding to the CE level.

Further, if a first radio access network node (a radio access network node currently accessed by the terminal) stores no CE authorization information of the terminal, step S304a1 and S304a2 are performed, or step S304b1 to S304b4 are performed. Otherwise, step S305 is directly performed.

S304a1. A first radio access network node sends a CE authorization request to a radio access network node (namely, a second radio access network node) previously accessed by the terminal.

S304a2. The second radio access network node sends CE authorization information of the terminal to the first radio access network node.

S304b1. A first radio access network node sends a CE authorization request to an MME.

Further, if the MME stores no subscription information of the terminal, step S304b2 is performed. Otherwise, step S304b3 is performed.

S304b2. The MME obtains subscription information of the terminal from an HSS or an MME (namely, an original MME) to which the terminal is previously attached.

S304b3. The MME determines CE authorization information of the terminal based on subscription information and CE capability information of the terminal.

S304b4. The MME sends the CE authorization information of the terminal to the first radio access network node.

S305. The first radio access network node determines, based on CE authorization information, whether the CE level of the terminal meets an authorization requirement, and controls, based on an authorization result, use of a CE function by the terminal.

Optionally, if the CE authorization information includes CE indication information, the first radio access network node determines, based on the CE indication information, whether the terminal is allowed to use the CE function. (A) If determining that the terminal is not allowed to use the CE function, the first radio access network node performs step S306a. (B) If determining that the terminal is allowed to use the CE function, the first radio access network node determines the CE level of the terminal based on a radio access channel resource used by the terminal. (B1) When the CE authorization information does not include other informa-tion, the first radio access network node determines a CE transmission parameter corresponding to the CE level of the terminal, and performs step S306b. (B2) When the CE authorization information further includes an authorized CE level range, the first radio access network node further determines whether the CE level of the terminal falls within the authorized CE level range. (B2a) If determining that the CE level of the terminal falls within the authorized CE level range, the first radio access network node determines a CE transmission parameter corresponding to the CE level of the terminal, and performs step S306b. (B2b) If determining that the CE level of the terminal falls beyond the authorized CE level range, the first radio access network node performs step S306a.

S306a. The first radio access network node sends a network access rejection message (which may carry information indicating that the CE function of the terminal does not meet the authorization requirement) to the terminal. Optionally, the indication information includes: the terminal does not meet the authorization requirement to use the CE function and/or the CE level used by the terminal falls beyond the authorized CE level range.

S306b. The first radio access network node sends a CE transmission parameter to the terminal, so that the terminal performs data transmission based on the CE transmission parameter.

In this embodiment of this application, the MME determines the CE authorization information of the terminal based on the subscription information and the CE capability information of the terminal, and sends the CE authorization information of the terminal to the first radio access network node. Further, the first radio access network node determines, based on the CE authorization information, whether the CE level of the terminal meets the authorization requirement, and controls, based on the authorization result, use of the CE function by the terminal. It can be learned that, only an authorized terminal can use the CE function, to ensure that the terminal can use the CE function properly within an authorized range and to improve radio channel resource use efficiency.

Figure 4:
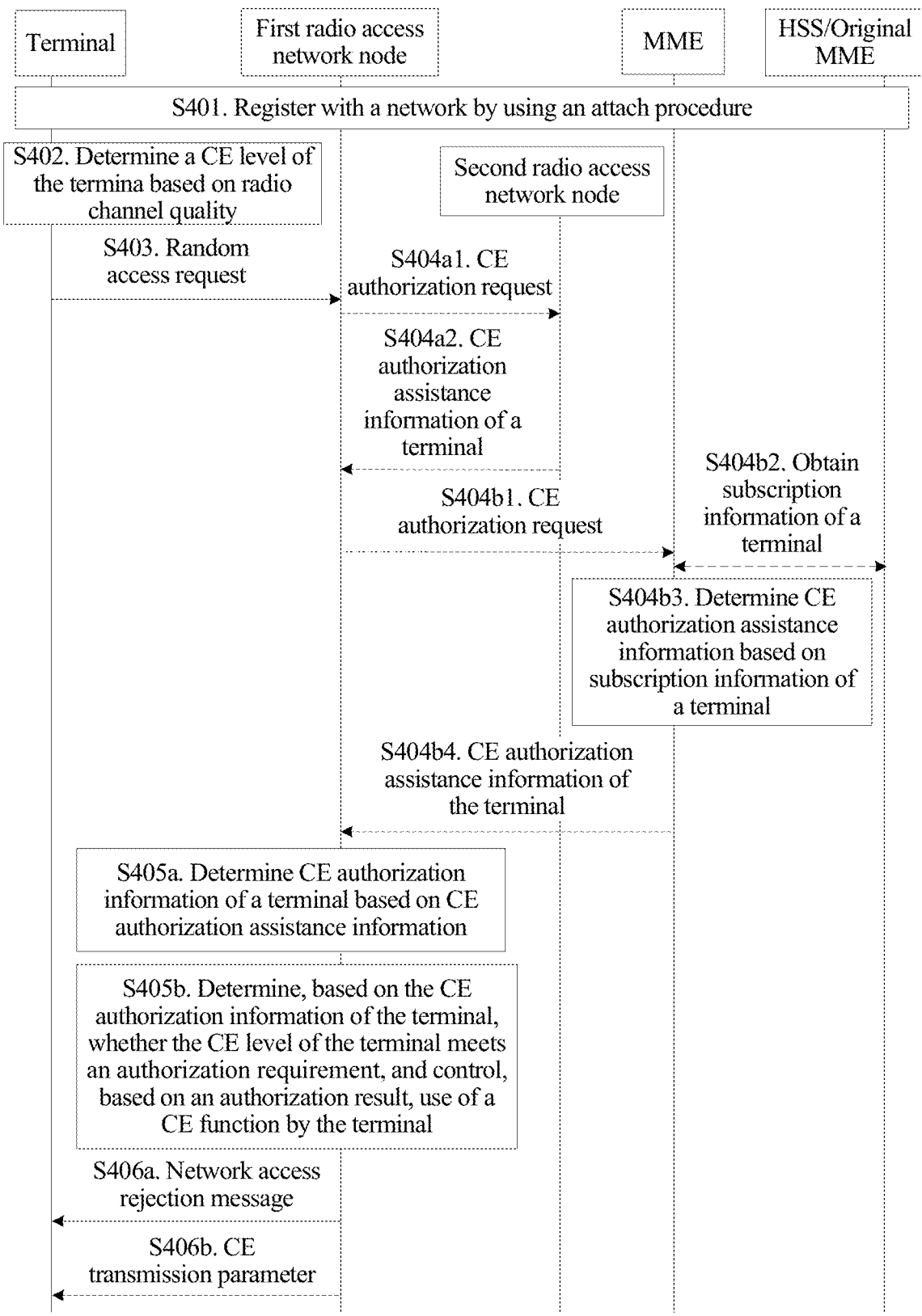
FIG. 4 is a schematic flowchart of Embodiment 3 of a coverage enhancement CE function implementation method according to the present application.

FIG. 4 is a schematic flowchart of Embodiment 3 of a coverage enhancement CE function implementation method according to the present application. Based on Embodiment 1 and/or Embodiment 2, as shown in FIG. 4, the method in this embodiment may include the following steps.

S401. A terminal registers with a network by using an attach procedure.

Optionally, an MME (for example, an MME to which the terminal is currently attached) may obtain CE capability information (for example, whether the terminal supports a CE function) of the terminal in the attach procedure.

S402. The terminal determines a CE level of the terminal based on radio channel quality.

In this step, when the terminal has data or signaling to be sent, the terminal determines the CE level based on the radio channel quality.

S403. The terminal initiates a random access request.

Optionally, the terminal initiates the random access request by using a radio channel resource corresponding to the CE level.

Further, if a first radio access network node (for example, a radio access network node currently accessed by the terminal) stores no CE authorization assistance information of the terminal, step S404a1 and S404a2 are performed, or step S404b1 to S404b4 are performed. Otherwise, step S405a is directly performed.

S404a1. A first radio access network node sends a CE authorization request to a radio access network node (namely, a second radio access network node) previously accessed by the terminal.

S404a2. The second radio access network node sends CE authorization assistance information of the terminal to the first radio access network node.

S404b1. A first radio access network node sends a CE authorization request to an MME.

Further, if the MME stores no subscription information of the terminal, step S404b2 is performed. Otherwise, step S404b3 is performed.

S404b2. The MME obtains subscription information of the terminal from an HSS or an MME (namely, an original MME) to which the terminal is previously attached.

S404b3. The MME determines CE authorization assistance information based on subscription information of the terminal.

S404b4. The MME sends the CE authorization assistance information of the terminal to the first radio access network node.

S405a. The first radio access network node determines CE authorization information of the terminal based on CE authorization assistance information.

Optionally, the first radio access network node determines the CE authorization information of the terminal based on the CE authorization assistance information and/or a local policy.

S405b. The first radio access network node determines, based on the CE authorization information of the terminal, whether the CE level of the terminal meets an authorization requirement, and controls, based on an authorization result, use of a CE function by the terminal.

Optionally, if the CE authorization information includes CE indication information, the first radio access network node determines, based on the CE indication information, whether the terminal is allowed to use the CE function. (A) If determining that the terminal is not allowed to use the CE function, the first radio access network node performs step S406a. (B) If determining that the terminal is allowed to use the CE function, the first radio access network node determines the CE level of the terminal based on a radio access channel resource used by the terminal. (B1) When the CE authorization information does not include other information, the first radio access network node determines a CE transmission parameter corresponding to the CE level of the terminal, and performs step S406b. (B2) When the CE authorization information further includes an authorized CE level range, the first radio access network node further determines whether the CE level of the terminal falls within the authorized CE level range. (B2a) If determining that the CE level of the terminal falls within the authorized CE level range, the first radio access network node determines a CE transmission parameter corresponding to the CE level of the terminal, and performs step S406b. (B2b) If determining that the CE level of the terminal falls beyond the authorized CE level range, the first radio access network node performs step S406a.

S406a. The first radio access network node sends a network access rejection message (which may carry information indicating that the CE function of the terminal does not meet the authorization requirement) to the terminal. Optionally, the indication information includes: the terminal does not meet the authorization requirement to use the CE function and/or the CE level used by the terminal falls beyond the authorized CE level range.

S406b. The first radio access network node sends a CE transmission parameter to the terminal, so that the terminal performs data transmission based on the CE transmission parameter.

In this embodiment of this application, the first radio access network node obtains the CE authorization assistance information of the terminal from the second radio access network node or the MME, and determines the CE authorization information of the terminal based on the CE authorization assistance information of the terminal. Further, the first radio access network node determines, based on the CE authorization information, whether the CE level of the terminal meets the authorization requirement, and controls, based on the authorization result, use of the CE function by the terminal. It can be learned that, only an authorized terminal can use the CE function, to ensure that the terminal can use the CE function properly within an authorized range and to improve radio channel resource use efficiency.

Figure 5:
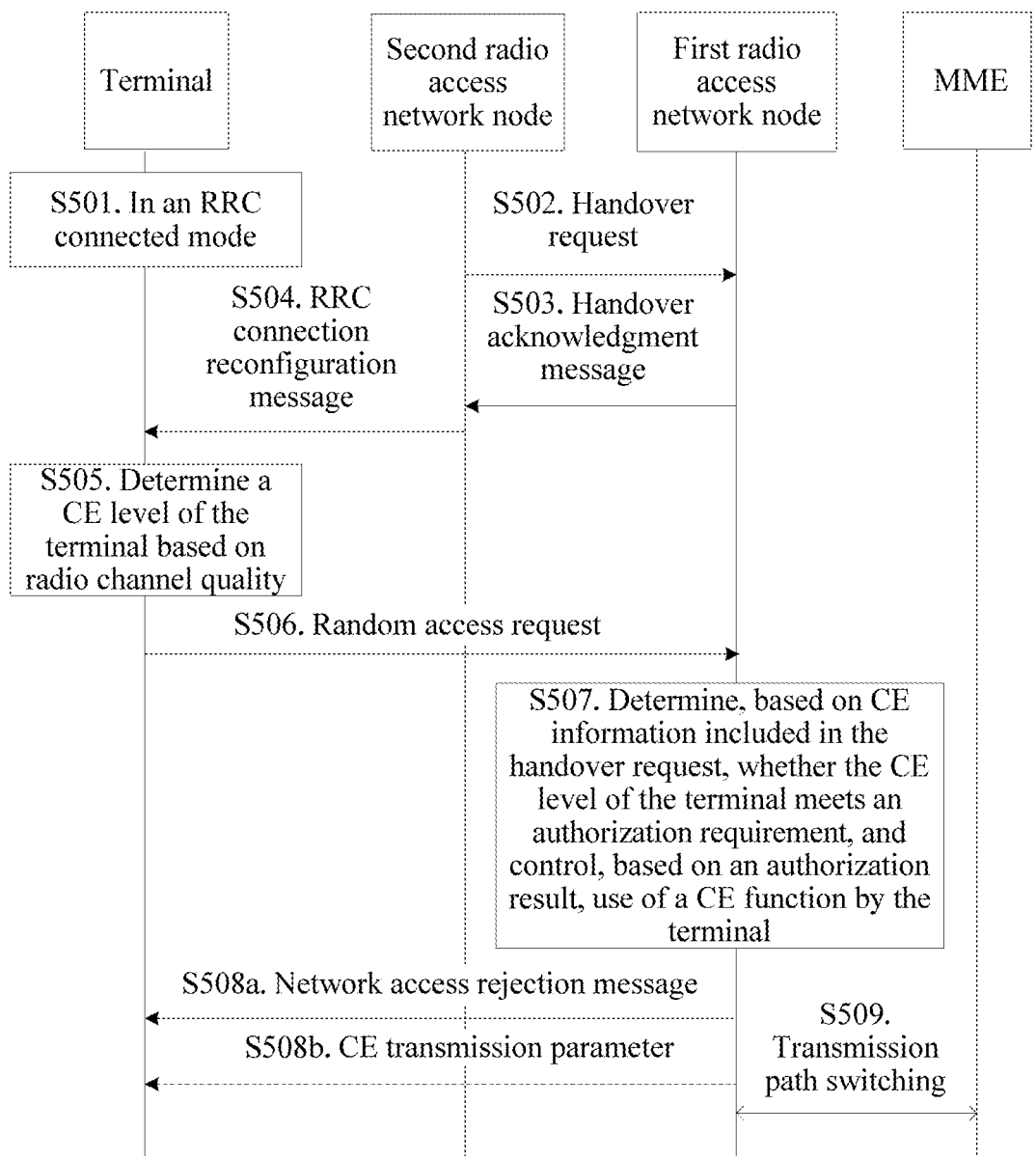
FIG. 5 is a schematic flowchart of Embodiment 4 of a coverage enhancement CE function implementation method according to the present application.

FIG. 5 is a schematic flowchart of Embodiment 4 of a coverage enhancement CE function implementation method according to the present application. Based on the foregoing embodiment, as shown in FIG. 5, the method in this embodiment may include the following steps.

S501. A terminal is in a radio resource control (Radio Resource Control, RRC for short) connected mode (or in other words, has data or signaling being received or sent).

S502. A second radio access network node (namely, a source radio access network node) sends a handover request to a first radio access network node (namely, a target radio access network node). Optionally, the handover request includes CE information (where the CE information is CE authorization information or CE authorization assistance information of the terminal).

Optionally, the second radio access network node determines, based on a measurement report and radio channel resource management information, whether to hand over the terminal to another cell. If determining to hand over the terminal to a target radio access network node, the second radio access network node sends the handover request to the first radio access network node.

S503. The first radio access network node returns a handover acknowledgment message to the second radio access network node. Optionally, the handover acknowledgment message includes information (for example, information such as a temporary identifier of the first radio access network node and/or a security algorithm of the first radio access network node) required by the terminal to perform a handover.

Optionally, the first radio access network node returns the handover acknowledgment message to the second radio access network node only after completing handover preparation.

S504. The second radio access network node sends an RRC connection reconfiguration message to the terminal. Optionally, the RRC connection reconfiguration message includes information that is provided by the first radio access network node and that is required by the terminal to perform handover.

S505. The terminal determines a CE level of the terminal based on radio channel quality.

S506. The terminal initiates a random access request to the first radio access network node.

Optionally, the terminal initiates the random access request to the first radio access network node by using a radio channel resource corresponding to the CE level.

S507. The first radio access network node determines, based on the CE information included in the handover request, whether the CE level of the terminal meets an authorization requirement, and controls, based on an authorization result, use of a CE function by the terminal.

(A) If the CE information is the CE authorization information of the terminal, the first radio access network node directly determines, based on the CE authorization information of the terminal, whether the CE level of the terminal meets the authorization requirement, and controls, based on the authorization result, use of the CE function by the terminal. (B) If the CE information is the CE authorization assistance information of the terminal, the first radio access network node determines the CE authorization information of the terminal based on the CE authorization assistance information of the terminal, determines, based on the CE authorization information of the terminal, whether the CE level of the terminal meets the authorization requirement, and controls, based on the authorization result, use of the CE function by the terminal.

Optionally, if the CE authorization information includes CE indication information, the first radio access network node determines, based on the CE indication information, whether the terminal is allowed to use the CE function. (A) If determining that the terminal is not allowed to use the CE function, the first radio access network node performs step S508a. (B) If determining that the terminal is allowed to use the CE function, the first radio access network node determines the CE level of the terminal based on a radio access channel resource used by the terminal. (B1) When the CE authorization information does not include other information, the first radio access network node determines a CE transmission parameter corresponding to the CE level of the terminal, and performs step S508b. (B2) When the CE authorization information further includes an authorized CE level range, the first radio access network node further determines whether the CE level of the terminal falls within the authorized CE level range. (B2a) If determining that the CE level of the terminal falls within the authorized CE level range, the first radio access network node determines a CE transmission parameter corresponding to the CE level of the terminal, and performs step S508b. (B2b) If determining that the CE level of the terminal falls beyond the authorized CE level range, the first radio access network node performs step S508a.

S508a. The first radio access network node sends a network access rejection message (which may carry information indicating that the CE function of the terminal does not meet the authorization requirement) to the terminal. Optionally, the indication information includes: the terminal does not meet the authorization requirement to use the CE function and/or the CE level used by the terminal falls beyond the authorized CE level range.

S508b. The first radio access network node sends a CE transmission parameter to the terminal, so that the terminal performs data transmission based on the CE transmission parameter.

S509. The first radio access network node and an MME perform transmission path switching, to switch a data transmission path of the terminal to the first radio access network node.

In this embodiment of this application, the first radio access network node determines, based on the CE information included in the handover request, whether the CE level of the terminal meets the authorization requirement, and controls, based on the authorization result, use of the CE function by the terminal. It can be learned that, only an authorized terminal can use the CE function, to ensure that the terminal can use the CE function properly within an authorized range and to improve radio channel resource use efficiency.

Figure 6:
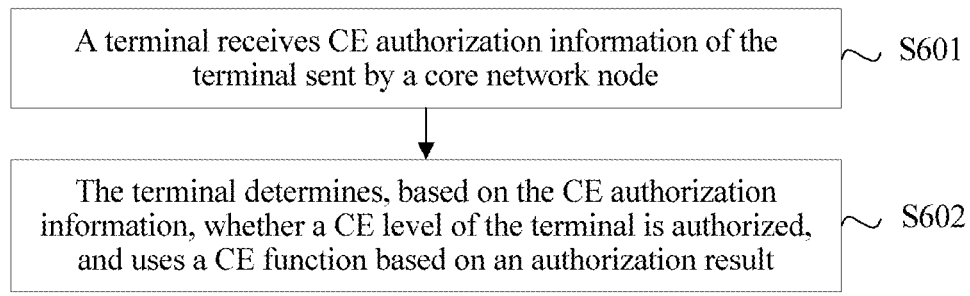
FIG. 6 is a schematic flowchart of Embodiment 5 of a coverage enhancement CE function implementation method according to the present application.

FIG. 6 is a schematic flowchart of Embodiment 5 of a coverage enhancement CE function implementation method according to the present application. As shown in FIG. 6, the method in this embodiment may include the following steps.

S601. A terminal receives CE authorization information of the terminal sent by a core network node.

In this step, after the terminal sends an attach request (optionally, the attach request carries CE capability information of the terminal) to the core network node (for example, an MME to which the terminal is currently attached or previously attached) by using a first radio access network node, the core network node determines the CE authorization information of the terminal based on subscription information and the CE capability information of the terminal, and sends the CE authorization information of the terminal to the terminal. Then the terminal receives the CE authorization information sent by the core network node. Optionally, the CE authorization information of the terminal includes at least one of the following: CE indication information and an authorized CE level range. Certainly, the CE authorization information may further include other information (for example, a CE status, where the CE status is used to indicate dynamic CE or static CE). This is not limited in this embodiment of this application. The CE indication information is used to indicate whether the terminal is allowed to use a CE function, and the authorized CE level range is used to indicate a range of a CE level that the terminal is allowed to use.

S602. The terminal determines, based on the CE authorization information, whether a CE level of the terminal meets an authorization requirement, and uses a CE function based on an authorization result.

In this step, the terminal determines, based on the CE authorization information, whether the CE level of the terminal meets the authorization requirement, and uses the CE function based on the authorization result (for example, the CE level of the terminal meets the authorization requirement or the CE level of the terminal does not meet the authorization requirement). Optionally, (A) if the authorization result is that the CE level of the terminal meets the authorization requirement, the terminal accesses a network by using a radio channel resource corresponding to the CE level; (B) if the authorization result is that the CE level of the terminal does not meet the authorization requirement, the terminal does not initiate random access.

Optionally, if the CE authorization information includes the CE indication information, the terminal determines, based on the CE indication information, whether the terminal is allowed to use the CE function. (A) If the terminal determines, based on the CE indication information (for example, indicating that the terminal is allowed to use the CE function), that the terminal is allowed to use the CE function, the terminal determines that the CE level of the terminal meets the authorization requirement. Optionally, the CE level of the terminal is a CE level of the terminal determined by the terminal based on radio channel quality of the terminal after the terminal determines that the terminal is allowed to use the CE function. (B) If the terminal determines, based on the CE indication information (indicating that the terminal is not allowed to use the CE function), that the terminal is not allowed to use the CE function, the terminal determines that the CE level of the terminal does not meet the authorization requirement.

Optionally, if the CE authorization information includes the authorized CE level range (implicitly indicating that the terminal is allowed to use the CE function), the terminal determines, based on the CE authorization information, whether the CE level of the terminal falls within the authorized CE level range. Optionally, the CE level of the terminal is a CE level of the terminal determined by the terminal based on radio channel quality of the terminal. (A) If the CE level of the terminal falls within the authorized CE level range, the terminal determines that the CE level of the terminal meets the authorization requirement. (B) If the CE level of the terminal falls beyond the authorized CE level range, the terminal determines that the CE level of the terminal does not meet the authorization requirement.

Optionally, if the CE authorization information includes the CE indication information and the authorized CE level range, the terminal determines, based on the CE indication information, whether the terminal is allowed to use the CE function. (A1) If the terminal determines, based on the CE indication information (indicating that the terminal is not allowed to use the CE function), that the terminal is not allowed to use the CE function, the terminal determines that the CE level of the terminal does not meet the authorization requirement. (B1) If the terminal determines, based on the CE indication information (for example, indicating that the terminal is allowed to use the CE function), that the terminal is allowed to use the CE function, the terminal determines, based on the CE authorization information, whether the CE level of the terminal falls within the authorized CE level range. Optionally, the CE level of the terminal is a CE level of the terminal determined by the terminal based on radio channel quality of the terminal. (B11) If the CE level of the terminal falls within the authorized CE level range, the terminal determines that the CE level of the terminal meets the authorization requirement. (B12) If the CE level of the terminal falls beyond the authorized CE level range, the terminal determines that the CE level of the terminal does not meet the authorization requirement.

In view of the above, in this embodiment of this application, the terminal receives the CE authorization information of the terminal sent by the core network node, determines, based on the CE authorization information, whether the CE level of the terminal meets the authorization requirement, and uses the CE function based on the authorization result. It can be learned that, not all terminals can use the CE function, but only an authorized terminal can use the CE function, to ensure that the terminal can use the CE function properly within an authorized range and to improve radio channel resource use efficiency.

Figure 7:
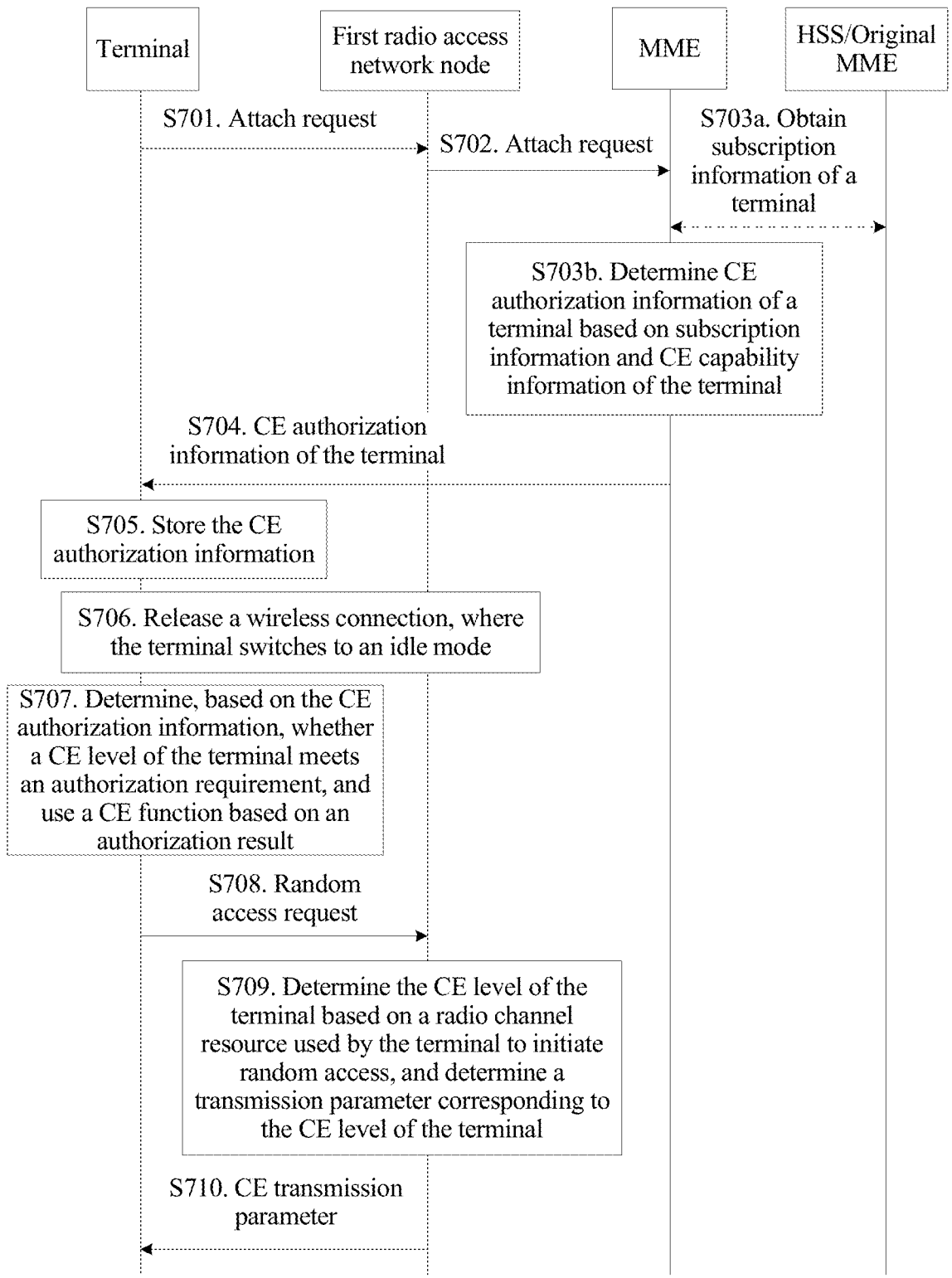
FIG. 7 is a schematic flowchart of Embodiment 6 of a coverage enhancement CE function implementation method according to the present application.

FIG. 7 is a schematic flowchart of Embodiment 6 of a coverage enhancement CE function implementation method according to the present application. Based on Embodiment 5, as shown in FIG. 7, the method in this embodiment may include the following steps.

S701. A terminal sends an attach request. Optionally, the attach request carries CE capability information (for example, whether the terminal supports a CE function) of the terminal.

S702. A first radio access network node forwards the attach request to an MME, where the MME is an MME to which the terminal is currently attached.

Further, if the MME stores no subscription information of the terminal, step S703a is performed. Otherwise, step S703b is performed.

S703a. The MME obtains subscription information of the terminal from an HSS or an MME (namely, an original MME) to which the terminal is previously attached.

S703b. The MME determines CE authorization information of the terminal based on subscription information and CE capability information of the terminal.

S704. The MME sends the CE authorization information of the terminal to the terminal.

Optionally, the CE authorization information of the terminal may be carried in an attach accept message. Certainly, the CE authorization information of the terminal may be carried in another message, and this is not limited in this embodiment of this application.

S705. The terminal stores the CE authorization information, to determine, based on the CE authorization information, whether a CE level of the terminal meets an authorization requirement.

If the terminal has no data or signaling to be sent, step S706 is performed. If the terminal has data or signaling to be sent, step S707 is performed.

S706. Release a wireless connection, where the terminal switches to an idle mode.

S707. The terminal determines, based on the CE authorization information, whether the CE level of the terminal meets an authorization requirement, and uses a CE function based on an authorization result.

Optionally, if the CE authorization information includes CE indication information, the terminal determines, based on the CE indication information, whether the terminal is allowed to use the CE function. (A) If determining that the terminal is not allowed to use the CE function, the terminal does not initiate random access. (B) If determining that the terminal is allowed to use the CE function, the terminal determines the CE level of the terminal based on a radio access channel resource used by the terminal. (B1) When the CE authorization information does not include other information, the terminal performs step S708. (B2) When the CE authorization information further includes an authorized CE level range, the terminal further determines whether the CE level of the terminal falls within the authorized CE level range. (B2a) If determining that the CE level of the terminal falls within the authorized CE level range, the terminal performs step S708. (B2b) If determining that the CE level of the terminal falls beyond the authorized CE level range, the terminal does not initiate random access.

S708. The terminal initiates a random access request.

Optionally, the terminal initiates the random access request by using a radio channel resource corresponding to the CE level.

S709. The first radio access network node determines the CE level of the terminal based on a radio channel resource used by the terminal to initiate random access, and determines a CE transmission parameter corresponding to the CE level of the terminal.

S710. The first radio access network node sends the CE transmission parameter to the terminal, so that the terminal performs data transmission based on the CE transmission parameter.

Optionally, in step S704 in this embodiment of this application, the MME may further send the CE authorization information of the terminal to the first radio access network node. Correspondingly, in step S709, before determining the CE transmission parameter corresponding to the CE level of the terminal, the first radio access network node may further determine again, based on the CE authorization information, whether the CE level of the terminal meets the authorization requirement, and control, based on the authorization result, use of the CE function by the terminal. Specifically, for an implementation in which "the first radio access network node determines, based on the CE authorization information, whether the CE level of the terminal meets the authorization requirement, and controls, based on the authorization result, use of the CE function by the terminal", refer to the part that "the first radio access network node determines, based on CE authorization information of the terminal, whether the CE level of the terminal meets the authorization requirement, and controls, based on an authorization result, use of a CE function by the terminal" in Embodiment 2 or Embodiment 3. Details are not described herein again.

In this embodiment of this application, the MME determines the CE authorization information of the terminal based on the subscription information and the CE capability information of the terminal, and sends the CE authorization information of the terminal to the terminal. Further, the terminal determines, based on the CE authorization information, whether the CE level of the terminal meets the authorization requirement, and uses the CE function based on the authorization result. It can be learned that, only an authorized terminal can use the CE function, to ensure that the terminal can use the CE function properly within an authorized range and to improve radio channel resource use efficiency.

Figure 8:
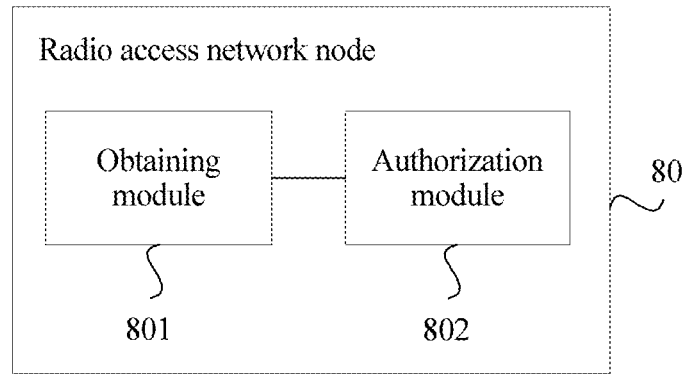
FIG. 8 is a schematic structural diagram of Embodiment 1 of a radio access network node according to the present application.

FIG. 8 is a schematic structural diagram of Embodiment 1 of a radio access network node according to the present application. A radio access network node 80 provided in this embodiment is a first radio access network node. As shown in FIG. 8, the radio access network node 80 includes:

an obtaining module 801, configured to obtain CE authorization information of a terminal, where the CE authorization information includes at least one of the following: CE indication information and an authorized CE level range; and an authorization module 802, configured to: determine, based on the CE authorization information, whether a CE level of the terminal meets an authorization requirement, and control, based on an authorization result, use of a CE function by the terminal.

Optionally, the CE indication information is used to indicate whether the terminal is allowed to use the CE function, and the authorized CE level range is used to indicate a range of a CE level that the terminal is allowed to use.

Optionally, if the CE authorization information includes the CE indication information, the authorization module 802 is specifically configured to:

determine, based on the CE indication information, whether the terminal is allowed to use the CE function; and if determining, based on the CE indication information, that the terminal is allowed to use the CE function, determine that the CE level of the terminal meets the authorization requirement; or if determining, based on the CE indication information, that the terminal is not allowed to use the CE function, determine that the CE level of the terminal does not meet the authorization requirement.

Optionally, if the CE authorization information includes the authorized CE level range, the authorization module 802 is specifically configured to:

determine, based on the CE authorization information, whether the CE level of the terminal falls within the authorized CE level range; and if the CE level of the terminal falls within the authorized CE level range, determine that the CE level of the terminal meets the authorization requirement; or if the CE level of the terminal falls beyond the authorized CE level range, determine that the CE level of the terminal does not meet the authorization requirement.

Optionally, the authorization module 802 is further configured to:

determine the CE level of the terminal based on a radio access channel resource used by the terminal, where the radio access channel resource is a radio channel resource used by the terminal to initiate random access.

Optionally, the authorization module 802 is specifically configured to:

if the authorization result is that the CE level of the terminal meets the authorization requirement, allow the terminal to access a network by using a radio channel resource corresponding to the CE level; or if the authorization result is that the CE level of the terminal does not meet the authorization requirement, reject access of the terminal to a network.

Optionally, the obtaining module 801 is specifically configured to:

locally obtain the stored CE authorization information of the terminal; or receive the CE authorization information of the terminal sent by a core network node; or receive the CE authorization information of the terminal sent by a second radio access network node, where the second radio access network node is a historical radio access network node accessed by the terminal, and the historical radio access network node stores the CE authorization information of the terminal.

Optionally, the obtaining module 801 includes:

a receiving unit, configured to receive CE authorization assistance information sent by a core network node or a second radio access network node, where the second radio access network node is a historical radio access network node accessed by the terminal, and the historical radio access network node stores the CE authorization assistance information of the terminal; and a determining unit, configured to determine the CE authorization information of the terminal based on the CE authorization assistance information.

Optionally, the CE authorization assistance information includes at least one of the following: whether the terminal subscribes to the CE function and a range of a CE level to which the terminal subscribes.

Optionally, if the CE authorization assistance information includes whether the terminal subscribes to the CE function, the determining unit is specifically configured to: determine the CE indication information based on the CE authorization assistance information and/or a local policy, where the local policy includes at least one of the following: information about a radio channel resource supporting the CE function and a radio channel resource use status.

Optionally, if the CE authorization assistance information includes the range of a CE level to which the terminal subscribes, the determining unit is specifically configured to: determine the authorized CE level range based on the CE authorization assistance information and/or a local policy, where the local policy includes at least one of the following: information about a radio channel resource supporting the CE function and a radio channel resource use status.

The first radio access network node in this embodiment can be configured to perform the technical solutions in Embodiment 1 to Embodiment 4 of the foregoing coverage enhancement CE function implementation method in the present application. An implementation principle and a technical effect of this embodiment are similar to those of the method embodiment and are not described herein again.

Figure 9:
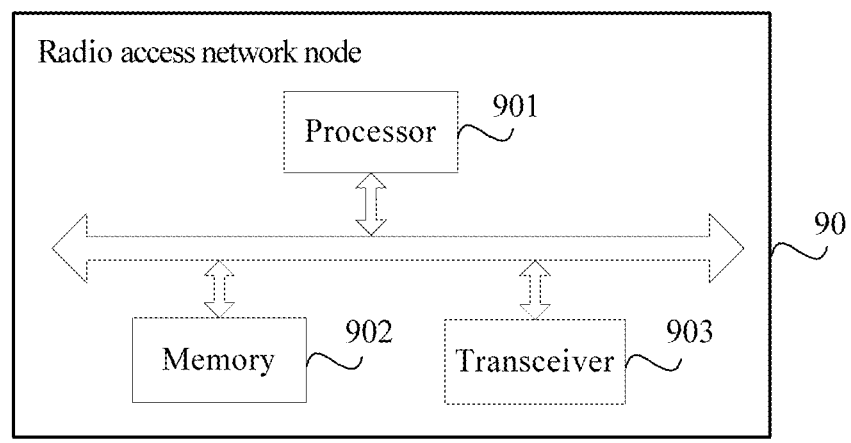
FIG. 9 is a schematic structural diagram of Embodiment 2 of a radio access network node according to the present application.

FIG. 9 is a schematic structural diagram of Embodiment 2 of a radio access network node according to the present application. A radio access network node 90 provided in this embodiment is a first radio access network node. As shown in FIG. 9, the radio access network node 90 provided in this embodiment may include a processor 901 and a memory 902. The radio access network node 90 may further include a transceiver 903. Both the memory 902 and the transceiver 903 are connected to the processor 901. The memory 902 is configured to store an execution instruction. The transceiver 903 is configured to receive and send data or information. The processor 901 is configured to execute the execution instruction in the memory 902, so that the radio access network node 90 performs the following operations:

obtaining CE authorization information of a terminal, where the CE authorization information includes at least one of the following: CE indication information and an authorized CE level range; and determining, based on the CE authorization information, whether a CE level of the terminal meets an authorization requirement, and controlling, based on an authorization result, use of a CE function by the terminal Optionally, the CE indication information is used to indicate whether the terminal is allowed to use the CE function, and the authorized CE level range is used to indicate a range of a CE level that the terminal is allowed to use.

Optionally, if the CE authorization information includes the CE indication information, the determining, based on the CE authorization information, whether a CE level of the terminal meets an authorization requirement includes:

determining, based on the CE indication information, whether the terminal is allowed to use the CE function; and if it is determined, based on the CE indication information, that the terminal is allowed to use the CE function, determining that the CE level of the terminal meets the authorization requirement; or if it is determined, based on the CE indication information, that the terminal is not allowed to use the CE function, determining that the CE level of the terminal does not meet the authorization requirement.

Optionally, if the CE authorization information includes the authorized CE level range, the determining, based on the CE authorization information, whether a CE level of the terminal meets an authorization requirement includes:

determining, based on the CE authorization information, whether the CE level of the terminal falls within the authorized CE level range; and if the CE level of the terminal falls within the authorized CE level range, determining that the CE level of the terminal meets the authorization requirement; or if the CE level of the terminal falls beyond the authorized CE level range, determining that the CE level of the terminal does not meet the authorization requirement.

Optionally, before the determining, based on the CE authorization information, whether the CE level of the terminal falls within the authorized CE level range, the following operation is further included:

determining the CE level of the terminal based on a radio access channel resource used by the terminal, where the radio access channel resource is a radio channel resource used by the terminal to initiate random access.

Optionally, the controlling, based on an authorization result, use of a CE function by the terminal includes:

if the authorization result is that the CE level of the terminal meets the authorization requirement, allowing the terminal to access a network by using a radio channel resource corresponding to the CE level; or if the authorization result is that the CE level of the terminal does not meet the authorization requirement, rejecting access of the terminal to a network.

Optionally, the obtaining CE authorization information of a terminal includes:

locally obtaining the stored CE authorization information of the terminal; or receiving the CE authorization information of the terminal sent by a core network node; or receiving the CE authorization information of the terminal sent by a second radio access network node, where the second radio access network node is a historical radio access network node accessed by the terminal, and the historical radio access network node stores the CE authorization information of the terminal.

Optionally, the obtaining CE authorization information of a terminal includes:

receiving CE authorization assistance information sent by a core network node or a second radio access network node, where the second radio access network node is a historical radio access network node accessed by the terminal, and the historical radio access network node stores the CE authorization assistance information of the terminal; and determining the CE authorization information of the terminal based on the CE authorization assistance information.

Optionally, the CE authorization assistance information includes at least one of the following: whether the terminal subscribes to the CE function and a range of a CE level to which the terminal subscribes.

Optionally, if the CE authorization assistance information includes whether the terminal subscribes to the CE function, the determining the CE authorization information of the terminal based on the CE authorization assistance information includes:

determining the CE indication information based on the CE authorization assistance information and/or a local policy, where the local policy includes at least one of the following: information about a radio channel resource supporting the CE function and a radio channel resource use status.

Optionally, if the CE authorization assistance information includes the range of a CE level to which the terminal subscribes, the determining the CE authorization information of the terminal based on the CE authorization assistance information includes:

determining the authorized CE level range based on the CE authorization assistance information and/or a local policy, where the local policy includes at least one of the following: information about a radio channel resource supporting the CE function and a radio channel resource use status.

The first radio access network node in this embodiment can be configured to perform the technical solutions in Embodiment 1 to Embodiment 4 of the foregoing coverage enhancement CE function implementation method in the present application. An implementation principle and a technical effect of this embodiment are similar to those of the method embodiment and are not described herein again.

Figure 10:
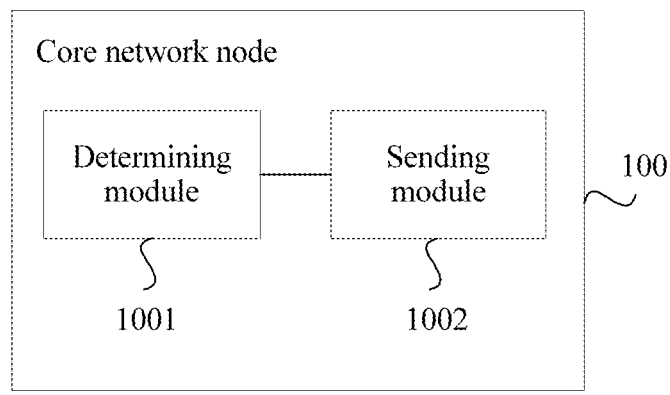
FIG. 10 is a schematic structural diagram of Embodiment 1 of a core network node according to the present application.

FIG. 10 is a schematic structural diagram of Embodiment 1 of a core network node according to the present application. As shown in FIG. 10, a core network node 100 provided in this embodiment includes:

a determining module 1001, configured to determine CE authorization information of a terminal based on subscription information and CE capability information of the terminal, where the CE authorization information includes at least one of the following: CE indication information and an authorized CE level range; and a sending module 1002, configured to send the CE authorization information to the terminal and/or a first radio access network node, so that the terminal and/or the first radio access network node determine/determines, based on the CE authorization information, whether a CE level of the terminal meets an authorization requirement.

The core network node in this embodiment can be configured to perform the technical solutions in Embodiment 1, Embodiment 2, and Embodiment 4 to Embodiment 6 of the foregoing coverage enhancement CE function implementation method in the present application. An implementation principle and a technical effect of this embodiment are similar to those of the method embodiment and are not described herein again.

Figure 11:
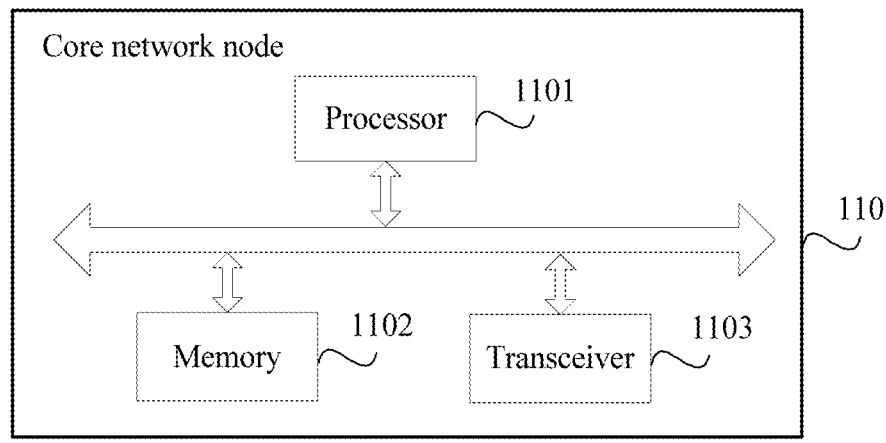
FIG. 11 is a schematic structural diagram of Embodiment 2 of a core network node according to the present application.

FIG. 11 is a schematic structural diagram of Embodiment 2 of a core network node according to the present application. As shown in FIG. 11, a core network node 110 provided in this embodiment may include a processor 1101, a memory 1102, and a transceiver 1103. Both the memory 1102 and the transceiver 1103 are connected to the processor 1101. The memory 1102 is configured to store an execution instruction. The processor 1101 is configured to execute the execution instruction in the memory 1102, to perform the following operation: determining CE authorization information of a terminal based on subscription information and CE capability information of the terminal, where the CE authorization information includes at least one of the following: CE indication information and an authorized CE level range. The transceiver 1103 is configured to send the CE authorization information to the terminal and/or a first radio access network node, so that the terminal and/or the first radio access network node determine/determines, based on the CE authorization information, whether a CE level of the terminal meets an authorization requirement.

The core network node in this embodiment can be configured to perform the technical solutions in Embodiment 1, Embodiment 2, and Embodiment 4 to Embodiment 6 of the foregoing coverage enhancement CE function implementation method in the present application. An implementation principle and a technical effect of this embodiment are similar to those of the method embodiment and are not described herein again.

A core network node provided in Embodiment 3 of the present application includes a determining module and a sending module.

The determining module is configured to determine CE authorization assistance information based on subscription information of a terminal.

The sending module is configured to send the CE authorization assistance information to a first radio access network node, so that the first radio access network node determines CE authorization information of the terminal based on the CE authorization assistance information, where the CE authorization information includes at least one of the following: CE indication information and an authorized CE level range.

Optionally, the CE authorization assistance information includes at least one of the following: whether the terminal subscribes to a CE function and a range of a CE level to which the terminal subscribes.

Optionally, a schematic structural diagram of the core network node provided in this embodiment is similar to the schematic structural diagram of the core network node provided in Embodiment 1 of the foregoing core network node.

The core network node in this embodiment can be configured to perform the technical solutions in Embodiment 1, Embodiment 3, and Embodiment 4 of the foregoing coverage enhancement CE function implementation method in the present application. An implementation principle and a technical effect of this embodiment are similar to those of the method embodiment and are not described herein again.

A core network node provided in Embodiment 4 of the present application may include a processor, a memory, and a transceiver. Both the memory and the transceiver are connected to the processor (optionally, a schematic structural diagram of the core network node provided in this embodiment is similar to the schematic structural diagram of the core network node provided in Embodiment 2 of the foregoing core network node). The memory is configured to store an execution instruction. The processor is configured to execute the execution instruction in the memory, to perform the following operation: determining CE authorization assistance information based on subscription information of a terminal. The transceiver is configured to send the CE authorization assistance information to a first radio access network node, so that the first radio access network node determines CE authorization information of the terminal based on the CE authorization assistance information, where the CE authorization information includes at least one of the following: CE indication information and an authorized CE level range.

Optionally, the CE authorization assistance information includes at least one of the following: whether the terminal subscribes to a CE function and a range of a CE level to which the terminal subscribes.

The core network node in this embodiment can be configured to perform the technical solutions in Embodiment 1, Embodiment 3, and Embodiment 4 of the foregoing coverage enhancement CE function implementation method in the present application. An implementation principle and a technical effect of this embodiment are similar to those of the method embodiment and are not described herein again.

Figure 12:
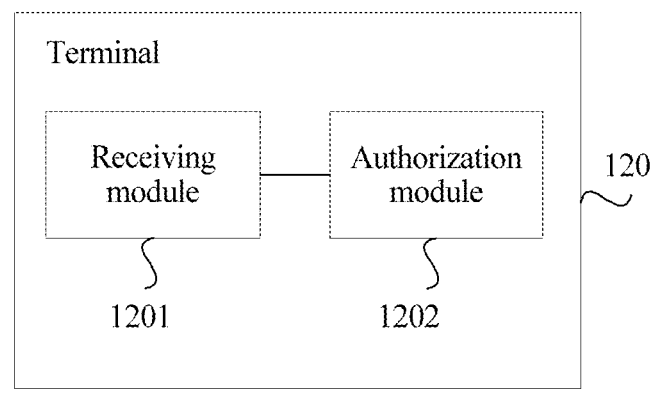
FIG. 12 is a schematic structural diagram of Embodiment 1 of a terminal according to the present application.

FIG. 12 is a schematic structural diagram of Embodiment 1 of a terminal according to the present application. As shown in FIG. 12, a terminal 120 provided in this embodiment includes:

a receiving module 1201, configured to receive CE authorization information of the terminal sent by a core network node, where the CE authorization information includes at least one of the following: CE indication information and an authorized CE level range; and an authorization module 1202, configured to: determine, based on the CE authorization information, whether a CE level of the terminal meets an authorization requirement, and use a CE function based on an authorization result.

Optionally, if the CE authorization information includes the CE indication information, the authorization module 1202 is specifically configured to:

determine, based on the CE indication information, whether the terminal is allowed to use the CE function; and if determining, based on the CE indication information, that the terminal is allowed to use the CE function, determine that the CE level of the terminal meets the authorization requirement; or if determining, based on the CE indication information, that the terminal is not allowed to use the CE function, determine that the CE level of the terminal does not meet the authorization requirement.

Optionally, if the CE authorization information includes the authorized CE level range, the authorization module 1202 is specifically configured to:

determine, based on the CE authorization information, whether the CE level of the terminal falls within the authorized CE level range; and if the CE level of the terminal falls within the authorized CE level range, determine that the CE level of the terminal meets the authorization requirement; or if the CE level of the terminal falls beyond the authorized CE level range, determine that the CE level of the terminal does not meet the authorization requirement.

Optionally, the authorization module 1202 is specifically configured to:

if the authorization result is that the CE level of the terminal meets the authorization requirement, access a network by using a radio channel resource corresponding to the CE level; or if the authorization result is that the CE level of the terminal does not meet the authorization requirement, skip initiating random access.

The terminal in this embodiment can be configured to perform the technical solutions in Embodiment 5 and Embodiment 6 of the foregoing coverage enhancement CE function implementation method in the present application. An implementation principle and a technical effect of this embodiment are similar to those of the method embodiment and are not described herein again.

Figure 13:
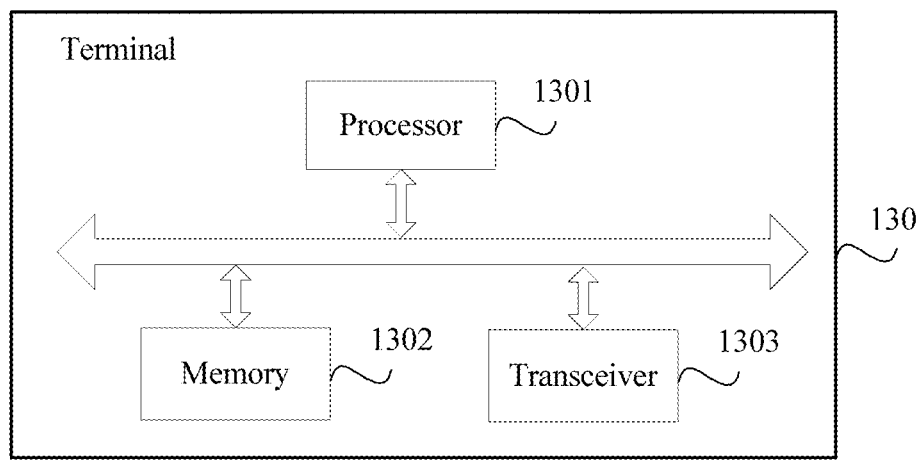
FIG. 13 is a schematic structural diagram of Embodiment 2 of a terminal according to the present application.

FIG. 13 is a schematic structural diagram of Embodiment 2 of a terminal according to the present application. As shown in FIG. 13, a terminal 130 provided in this embodiment may include a processor 1301, a memory 1302, and a transceiver 1303. Both the memory 1302 and the transceiver 1303 are connected to the processor 1301. The memory 1302 is configured to store an execution instruction. The transceiver 1303 is configured to receive CE authorization information of the terminal sent by a core network node, where the CE authorization information includes at least one of the following: CE indication information and an authorized CE level range. The processor 1301 is configured to execute the execution instruction in the memory 1302, to perform the following operation: determining, based on the CE authorization information, whether a CE level of the terminal meets an authorization requirement, and using a CE function based on an authorization result.

Optionally, if the CE authorization information includes the CE indication information, the determining, based on the CE authorization information, whether a CE level of the terminal meets the authorization requirement includes:

determining, based on the CE indication information, whether the terminal is allowed to use the CE function; and if it is determined, based on the CE indication information, that the terminal is allowed to use the CE function, determining that the CE level of the terminal meets the authorization requirement; or if it is determined, based on the CE indication information, that the terminal is not allowed to use the CE function, determining that the CE level of the terminal does not meet the authorization requirement.

Optionally, if the CE authorization information includes the authorized CE level range, the determining, based on the CE authorization information, whether a CE level of the terminal meets an authorization requirement includes:

determining, based on the CE authorization information, whether the CE level of the terminal falls within the authorized CE level range; and if the CE level of the terminal falls within the authorized CE level range, determining that the CE level of the terminal meets the authorization requirement; or if the CE level of the terminal falls beyond the authorized CE level range, determining that the CE level of the terminal does not meet the authorization requirement.

Optionally, the using a CE function based on an authorization result includes:

if the authorization result is that the CE level of the terminal meets the authorization requirement, accessing a network by using a radio channel resource corresponding to the CE level; or if the authorization result is that the CE level of the terminal does not meet the authorization requirement, skipping initiating random access.

The terminal in this embodiment can be configured to perform the technical solutions in Embodiment 5 and Embodiment 6 of the foregoing coverage enhancement CE function implementation method in the present application. An implementation principle and a technical effect of this embodiment are similar to those of the method embodiment and are not described herein again.

In the embodiments provided in the present application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of the present application may be integrated into one processing unit, or each of the units may exist alone physically, or two or more units are integrated into one unit. The integrated unit may be implemented in a form of hardware, or may be implemented in a form of hardware plus a software function unit.

When the integrated unit is implemented in a form of a software function unit, the integrated unit may be stored in a computer-readable storage medium. The software function unit is stored in a storage medium and includes instructions for instructing a computer device (which may be a personal computer, a server, a network device, or the like) or a processor to perform some of the steps of the methods described in the embodiments of the present application. The foregoing storage medium includes any medium that can store program code, such as a USB flash drive, a removable hard disk, a read-only memory (ROM), a random access memory (RAM), a magnetic disk, or an optical disc.

It may be clearly understood by persons skilled in the art that, for the purpose of convenient and brief description, division of the foregoing function modules is merely used as an example for illustration. In actual application, the foregoing functions can be allocated to and implemented by different function modules based on a requirement, or in other words, an internal structure of an apparatus is divided into different function modules to implement all or some of the functions described above. For a detailed working process of the foregoing apparatus, reference may be made to a corresponding process in the foregoing method embodiments, and details are not described herein again.

Persons skilled in the art may understand that the numbers such as "first" and "second" in this specification are merely for distinguishing for ease of description and are not intended to limit the scope of the embodiments of the present application.

Persons of ordinary skill in the art may understand that sequence numbers of the foregoing processes do not mean particular execution sequences in various embodiments of the present application. The execution sequences of the processes should be determined based on functions and internal logic of the processes, and should not be construed as any limitation on the implementation processes of the embodiments of the present application.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a ROM, a RAM, a magnetic disk, or an optical disc.

Finally, it should be noted that the foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present application.

What is claimed is:

1. A coverage enhancement (CE) function implementation method, comprising:
    obtaining, by a core network node, CE capability information from a terminal, wherein the CE capability information of the terminal comprises information indicative a functional ability of the terminal for performing the CE function;
    determining, by the core network node, CE authorization information of the terminal based on subscription information and the CE capability information of the terminal, wherein the CE authorization information comprises a CE indication information, the CE indication information indicates whether the terminal is allowed to use the CE function; and
    sending, by the core network node, the CE authorization information to the terminal.

2. The method according to claim 1, wherein the CE authorization information is carried in an attach accept message.

3. The method according to claim 1, wherein the method further comprises:
    obtaining, by the core network node, the subscription information of the terminal from a Home Subscriber Server (HSS).

4. The method according to claim 1, wherein the method further comprises:
    obtaining, by the core network node, the CE capability information of the terminal in an attach procedure.

5. The method according to claim 1, wherein the CE authorization information further comprises an authorized CE level range determined based on subscription information of the terminal, and the CE indication information indicates whether the terminal subscribes to the CE function and the authorized CE level range indicates a range of a CE level to which the terminal subscribes, the method further comprising: sending, by the core network node, the CE authorization information to the terminal when a CE level of the terminal is within the authorized CE level range of the terminal, the CE level obtained by the core network node from the terminal.

6. A coverage enhancement (CE) function implementation method, comprising:
    sending, by a terminal to a core network node, CE capability information, wherein the CE capability information of the terminal comprises information indicative a functional ability of the terminal for performing the CE function;
    receiving, by the terminal, CE authorization information of the terminal determined by the core network node, wherein the CE authorization information comprises CE indication information, and wherein the CE indication information is used to indicate the terminal is allowed to use the CE function, and wherein the core network node makes the determination using the CE capability information sent by the terminal indicating whether the terminal supports the CE function;
    in response to the CE indication information, determining, by the terminal, that the terminal is allowed to use the CE function;
    determining, by the terminal based on radio channel quality of the terminal, a CE level of the terminal; and
    initiating, by the terminal, a random access request by using a radio channel resource corresponding to the CE level.

7. The method according to claim 6, wherein the CE authorization information is carried in an attach accept message.

8. A core network node, comprising:
    a memory configured to store an execution instruction; and
    a processor configured to execute the execution instruction in the memory to perform the following operations:
        obtaining coverage enhancement (CE) capability information from a terminal, wherein the CE capability information of the terminal comprises information indicative a functional ability of the terminal for performing the CE function,
        determining CE authorization information of the terminal based on subscription information and the CE capability information of the terminal, wherein the CE authorization information comprises a CE indication information, the CE indication information indicates whether the terminal is allowed to use the CE function, and
        sending the CE authorization information to the terminal.

9. The core network node according to claim 8, wherein the CE authorization information is carried in an attach accept message.

10. The core network node according to claim 8, wherein the operations further comprise:
    obtaining the subscription information of the terminal from a Home Subscriber Server (HSS).

11. The core network node according to claim 8, wherein the operations further comprise:
    obtaining the CE capability information of the terminal in an attach procedure.

12. The core network node according to claim 8, wherein the CE authorization information further comprises an authorized CE level range determined based on subscription information of the terminal, and the CE indication information indicates whether the terminal subscribes to the CE function and the authorized CE level range indicates a range of a CE level to which the terminal subscribes, the operations further comprise: sending the CE authorization information to the terminal when a CE level of the terminal is within the authorized CE level range of the terminal, the CE level obtained by the core network node from the terminal.

13. A terminal, comprising:
    a memory configured to store an execution instruction; and
    a processor configured to execute the execution instruction in the memory to perform the following operations:
        sending, to a core network node, coverage enhancement (CE) capability information, wherein the CE capability information of the terminal comprises information indicative a functional ability of the terminal for performing the CE function,
        receiving CE authorization information of the terminal determined by the core network node, wherein the CE authorization information comprises CE indication information, and wherein the CE indication information is used to indicate the terminal is allowed to use the CE function, and wherein the core network node makes the determination using the CE capability information sent by the terminal indicating whether the terminal supports the CE function,
        determining that the terminal is allowed to use the CE function in response to the CE indication information,
        determining a CE level of the terminal based on radio channel quality of the terminal, and
        initiating a random access request by using a radio channel resource corresponding to the CE level.

14. The terminal according to claim 13, wherein the CE authorization information is carried in an attach accept message.

* * * * *